US011521492B2

(12) United States Patent
Way et al.

(10) Patent No.: US 11,521,492 B2
(45) Date of Patent: Dec. 6, 2022

(54) METHOD AND SYSTEM FOR INTER AND INTRA AGENCY COMMUNICATION, TRACKING AND COORDINATION

(71) Applicant: NORTH EAST KING COUNTY REGIONAL PUBLIC SAFETY COMMUNICATIONS AGENCY (NORCOM), Bellevue, WA (US)

(72) Inventors: Nathan Way, Brier, WA (US); Ron Tiedeman, Bellevue, WA (US)

(73) Assignee: NORCOM, Bellevue, WA (US)

( * ) Notice: Subject to any disclaimer, the term of this patent is extended or adjusted under 35 U.S.C. 154(b) by 0 days.

(21) Appl. No.: 17/172,917

(22) Filed: Feb. 10, 2021

(65) Prior Publication Data

US 2021/0272456 A1 Sep. 2, 2021

Related U.S. Application Data

(63) Continuation-in-part of application No. 17/007,855, filed on Aug. 31, 2020, now Pat. No. 11,069,015, and (Continued)

(51) Int. Cl.

| | |
|---|---|
| ***G08G 1/13*** | (2006.01) |
| ***G08G 1/00*** | (2006.01) |
| ***H04W 4/44*** | (2018.01) |
| ***H04W 4/029*** | (2018.01) |
| *H04W 4/90* | (2018.01) |

(52) U.S. Cl.
CPC ............... *G08G 1/13* (2013.01); *G08G 1/202* (2013.01); *H04W 4/029* (2018.02); *H04W 4/44* (2018.02); *H04W 4/90* (2018.02)

(58) Field of Classification Search
CPC ......... G08G 1/13; G08G 1/202; H04W 4/029; H04W 4/44; H04W 4/90; H04W 4/02; G06F 16/29; G06F 16/909; H04L 67/52; G06Q 10/10; G06Q 10/06315; G06Q 30/0205; G06Q 50/26
See application file for complete search history.

(56) References Cited

U.S. PATENT DOCUMENTS 6,477,387 B1 * 11/2002 Jackson ................ H04W 84/08 455/518
2004/0066329 A1 * 4/2004 Zeitfuss ................ G01S 5/0018 342/462

(Continued)

*Primary Examiner* — Farid Seyedvosoghi
(74) *Attorney, Agent, or Firm* — P G Scott Born; FisherBroyles LLP

(57) ABSTRACT

A method is disclosed. A data set including: (a) identifiers of a set of incidents occurring within a defined geographic region to which at least one service provider responded during a first time period and (b) address data identifying a location within the geographic region of each said incident of the set is retrieved over a network. An instruction to generate a heat map of the incidents occurring within the geographic region during the first time period is received from a user via a user interface generated to a display device. In response to the instruction to generate the heat map, the address data is converted to GPS data. A heat map of an aerial view of the geographic region based on the GPS data is generated. The heat map is displayed to the display device in a user interface.

2 Claims, 48 Drawing Sheets

Related U.S. Application Data a continuation-in-part of application No. 16/917,182, filed on Jun. 30, 2020, now abandoned, which is a continuation of application No. 16/231,801, filed on Dec. 24, 2018, now Pat. No. 10,741,073, which is a continuation-in-part of application No. 14/213,995, filed on Mar. 14, 2014, now Pat. No. 10,194,301.

(60) Provisional application No. 62/972,474, filed on Feb. 10, 2020, provisional application No. 62/894,500, filed on Aug. 30, 2019, provisional application No. 62/609,942, filed on Dec. 22, 2017, provisional application No. 61/905,701, filed on Nov. 18, 2013, provisional application No. 61/792,517, filed on Mar. 15, 2013.

(56) References Cited

U.S. PATENT DOCUMENTS

| | | | | |
|---|---|---|---|---|
| 2007/0226314 | A1* | 9/2007 | Eick | G06F 16/986 709/217 |
| 2011/0016402 | A1* | 1/2011 | Dailey | G06F 1/324 715/744 |

* cited by examiner

FIG. 16A
Master Incident
Response Date
Problem
Priority
GEO Code
Response Plan
Radio Channel
Caution Notes
Preplan Info
Address
Common Name
Call Receiver
Call Received Method
Caller Name
Call Back Phone
Jurisdiction
Unit(s) Assigned
Hazmat Info
Comments
Last Updated At:
Auto Refresh:

FIG. 19A
MOBILE REPORT VIEWER
From Date:
11/21/2017
To Date:
12/21/2017
Search for Case Number:
Select Report Type:
Select Report Status:
Select Incident Type:

FIG. 20
CAD Chat Message Audit
Export to Excel
CommID
Time
From
To
Message

FIG. 25
RAADAR
Active Calls
Search
Units
Resources
ePASS
Profile
Log Out
PASSPORT RADIO ASSIGNMENTS
Select Station: ST61
Select Apparatus: E61
Radio ID
Position
Assigned To
721958
Mobile E61
722012
OFC
WAY, Nathan
722013
Portable
722014
Portable

4100

METHOD AND SYSTEM FOR INTER AND INTRA AGENCY COMMUNICATION, TRACKING AND COORDINATION

CROSS-REFERENCE TO RELATED APPLICATIONS AND PRIORITY CLAIM

The present application claims priority from U.S. Pat. Appl. No. 62/972,474 filed Feb. 10, 2020. The present application is a continuation-in-part of U.S. application Ser. No. 17/007,855, filed Aug. 31, 2020, which claims priority from U.S. Provisional Application No. 62/894,500, filed Aug. 30, 2019 and is a continuation-in-part of U.S. application Ser. No. 16/917,182, filed Jun. 30, 2020, which is a continuation of U.S. application Ser. No. 16/231,801, filed Dec. 24, 2018, which claims priority from U.S. Provisional Application No. 62/609,942, filed Dec. 22, 2017 and is a continuation-in-part of U.S. application Ser. No. 14/213,995, filed Mar. 14, 2014, which claims priority from U.S. Provisional Application No. 61/792,517, filed Mar. 15, 2013, and U.S. Provisional Application No. 61/905,701, filed Nov. 18, 2013. All of the aforementioned applications are hereby incorporated by reference in their entireties as if fully set forth herein.

BACKGROUND OF THE INVENTION

Coordination among different first-responder agencies, such as police, ambulance and fire, within a community and among agencies in different communities is critical to the well-being of such community(ies). Consequently, a system and/or method that allows visual tracking, in real-time or as near to real-time as is technologically possible, of the location, velocity and bearing of emergency vehicles would be beneficial. Moreover, a system and/or method that allows a comprehensive visual review of coordination efforts after an emergency event of emergency vehicles responding to such event would be likewise beneficial.

Moreover, due to the market in Public Safety, previous approaches have been single solutions provided by each vendor and naming conventions that have no standard associated and use at each customer location. Several computer-aided dispatch (CAD) or records management systems all utilize different mechanisms specific to their systems only and rarely if at all share between disparate systems. As such, each customer utilizes naming conventions specific to their agency or application.

The constraint and limitations of previous approaches are related to a closed product approach that is only a single solution for that one software company, or any installation that have that same software. Previous approach is based on a vendor market to customers they provide services to without sharing, no standard industry naming conventions which are adjustable by customer for each individual need.

In emergency services, mutual aid is an agreement among emergency responders to lend assistance across jurisdictional boundaries. This may occur due to an emergency response that exceeds local resources, such as a disaster or a multiple-alarm fire. Mutual aid may be ad hoc, requested only when such an emergency occurs. It may also be a formal standing agreement for cooperative emergency management on a continuing basis, such as ensuring that resources are dispatched from the nearest fire station, regardless of which side of the jurisdictional boundary the incident is on.

Prior to the present invention, Public Safety Answering Points (PSAPs) would have to place a phone call to another PSAP when requesting mutual aid. The phone calls incur delays and can result in miscommunication or incomplete communication which could be detrimental to the first responders requested to assist on the incident. Additionally, the call details must be relayed to the first responders over the radio which is subject to background noise, interference and/or lost transmissions.

The previous approaches have several disadvantages:

Phone calls between PSAPs incur delays in obtaining critical incident information for first responders.

Radio transmissions can be garbled, missed or lost, which also can be detrimental to first responders.

BRIEF DESCRIPTION OF THE DRAWING

Preferred and alternative examples of the present invention are described in detail below with reference to the following drawing figures.

DETAILED DESCRIPTION

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Figure 1:
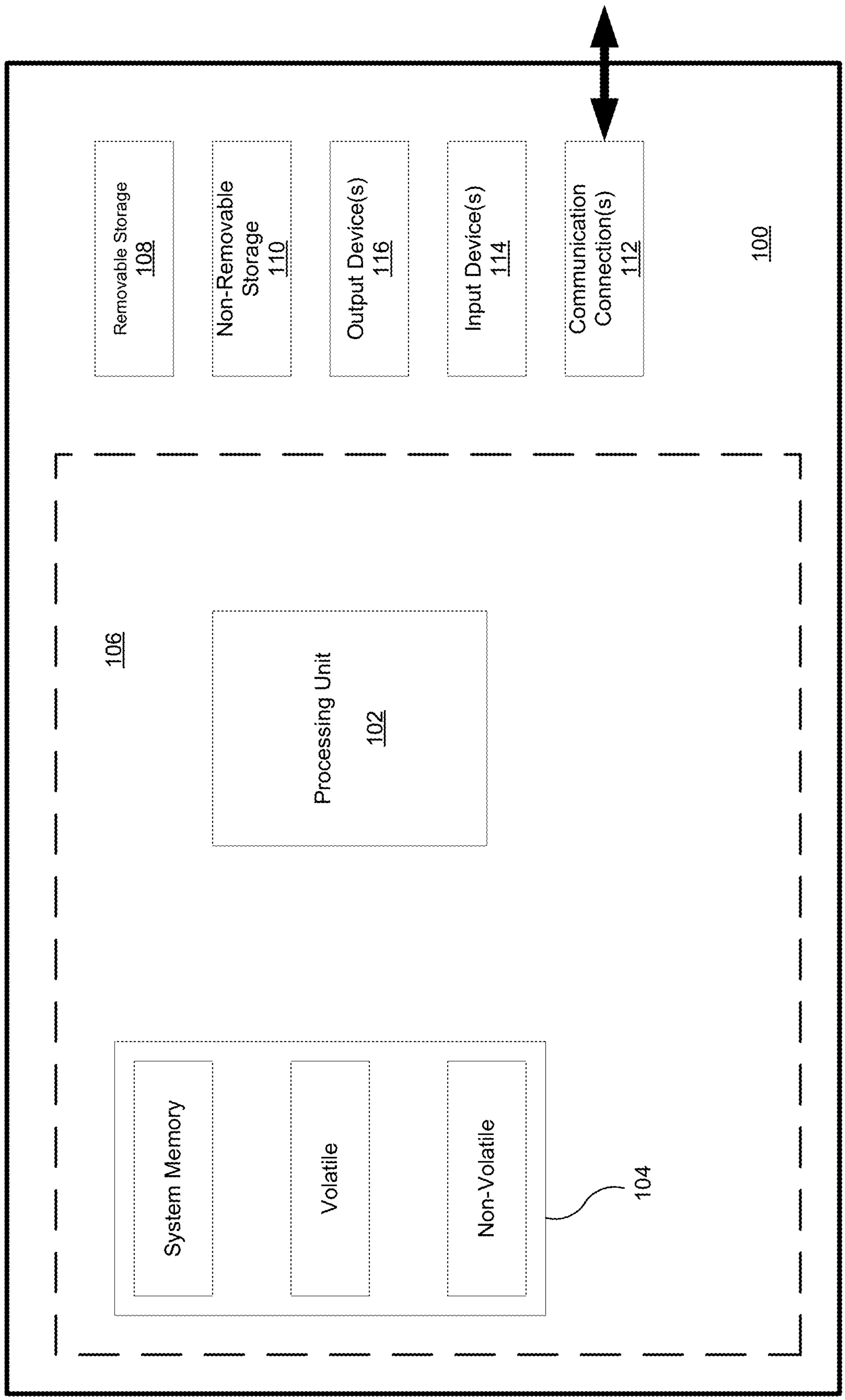
FIG. 1 is a schematic view of an exemplary operating environment in which an embodiment of the invention can be implemented.

FIG. 1 illustrates an example of a computing system environment 100 in which an embodiment of the invention may be implemented. The computing system environment 100, as illustrated, is an example of a suitable computing environment; however, it is appreciated that other environments, systems, and devices may be used to implement various embodiments of the invention as described in more detail below.

Embodiments of the invention are operational with numerous general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices. Additionally, the entity that may implement, or otherwise provide the ability to implement, elements of embodiments of the invention may be referred to herein as an "administrator."

With reference to FIG. 1, an exemplary system for implementing an embodiment of the invention includes a computing device, such as computing device 100. The computing device 100 typically includes at least one processing unit 102 and memory 104.

Depending on the exact configuration and type of computing device, memory 104 may be volatile (such as random-access memory (RAM)), nonvolatile (such as read-only memory (ROM), flash memory, etc.) or some combination of the two. This most basic configuration is illustrated in FIG. 1 by dashed line 106.

Additionally, the device 100 may have additional features, aspects, and functionality. For example, the device 100 may include additional storage (removable and/or non-removable) which may take the form of, but is not limited to, magnetic or optical disks or tapes. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

The device 100 may also include a communications connection 112 that allows the device to communicate with other devices. The communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 100 may also have an input device 114 such as keyboard, mouse, pen, voice-input device, touch-input device, etc. Further, an output device 116 such as a display, speakers, printer, etc. may also be included. Additional input devices 114 and output devices 116 may be included depending on a desired functionality of the device 100.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 2:
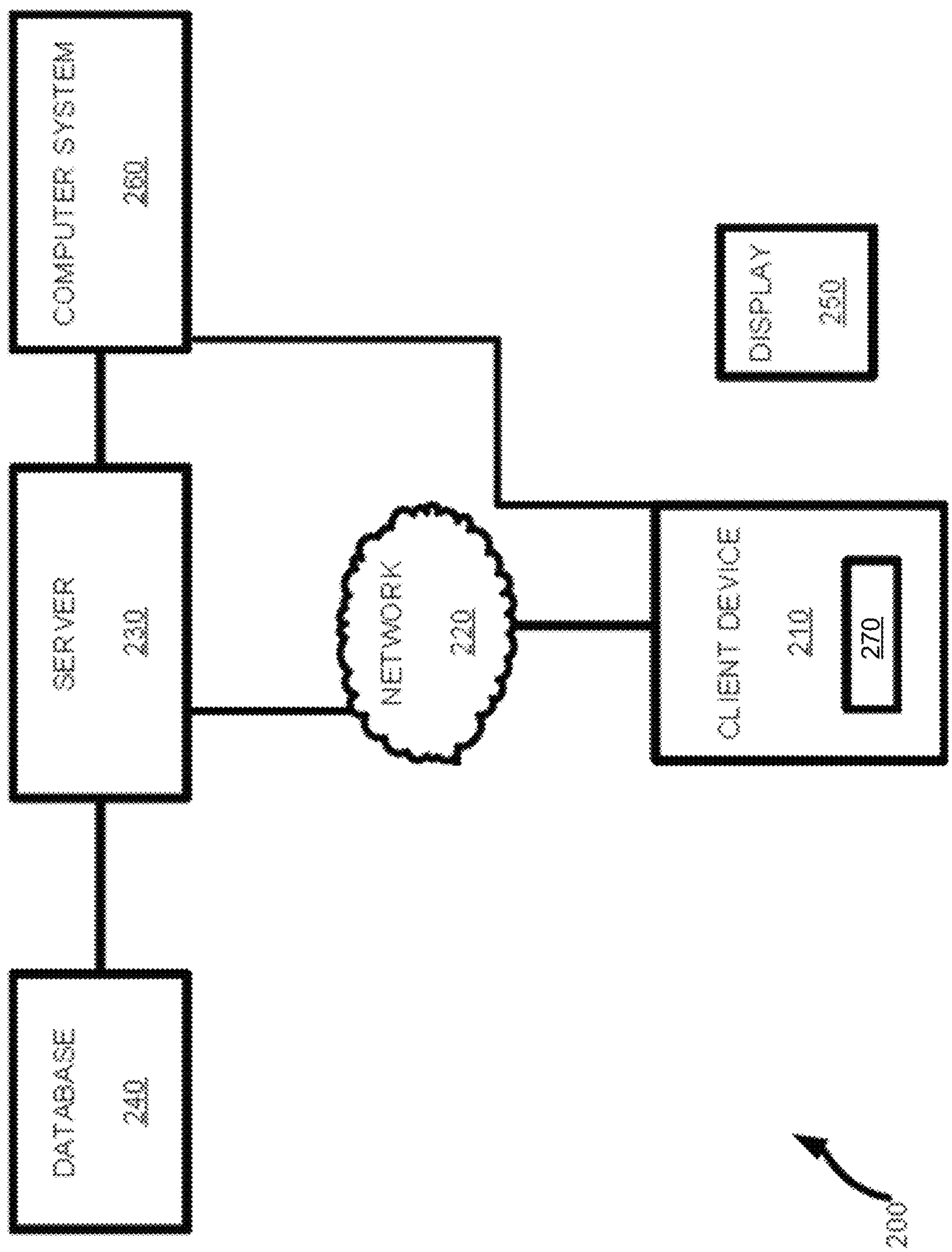
FIG. 2 is a functional block diagram of an exemplary operating environment in which an embodiment of the invention can be implemented.

Referring now to FIG. 2, an embodiment of the present invention may take the form, and/or may be implemented using one or more elements, of an exemplary computer network system 200. The system 200 includes an electronic client device 210, such as a personal computer or workstation, tablet or smart phone, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

The client device 210 and the server 230 may include all or fewer than all of the features associated with the device 100 illustrated in and discussed with reference to FIG. 1. The client device 210 includes or is otherwise coupled to a computer screen or display 250. The client device 210 may be used for various purposes such as network- and local-computing processes.

The client device 210 is linked via the network 220 to server 230 so that computer programs, such as, for example, a browser, running on the client device 210 can cooperate in two-way communication with server 230. The server 230 may be coupled to database 240 to retrieve information therefrom and to store information thereto. Database 240 may have stored therein data (not shown) that can be used by the server 230 and/or client device 210 to enable performance of various aspects of embodiments of the invention. The data stored in database 240 may include, for example, satellite and other aerial map data, including geographic information system (GIS)-layer data, automated vehicle locating (AVL) data and keyhole markup language (KML) data. Additionally, the server 230 may be coupled to the computer system 260 in a manner allowing the server to delegate certain processing functions to the computer system. In an embodiment, most or all of the functionality described herein may be implemented in a desktop application 270 that may include one or more executable modules. In an embodiment, the client device 210 may bypass network 220 and communicate directly with computer system 260.

Still referring to FIG. 2, and in operation according to an embodiment of the invention, a user (not shown) of the client device 210 desiring to track or review the performance of one or more emergency-response vehicles may invoke the desktop application 270. Alternatively, the user may invoke a browser running on the client device 210 to access web content, which may, but need not, be served by the server 230. Specifically, by employing an appropriate uniform resource locator (URL) in a known manner, the user may navigate to a website hosted by the server 230.

Figure 3:
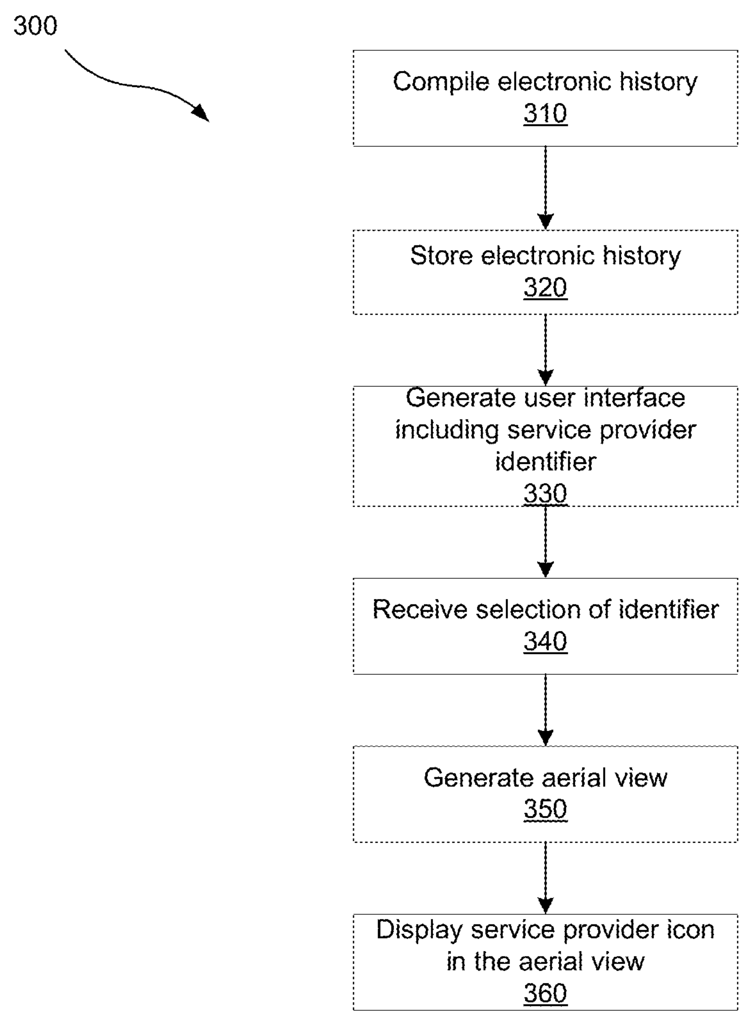
FIGS. 3-5 illustrates processes according to one or more embodiments of the invention.

FIG. 3 illustrates a process 300, according to an embodiment of the invention, for tracking a set of at least one emergency service provider. The process 300 is illustrated as a set of operations shown as discrete blocks. One or more steps of the process 300 may be implemented in any suitable hardware, software, including instructions embodied within components, firmware, or combination thereof. The order in which the operations associated with the process 300 are described is not to be necessarily construed as a limitation.

At a block 310, an electronic history is compiled. The electronic history includes at least one identifier of a service provider and GPS data identifying the geographic location of each service provider at each time interval within a time period. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles that are stored in database 240 and/or a memory device associated with client device 210. Such data will typically take the form of a latitude/longitude position of the response vehicle and the time at which such vehicle is in such position. Consequently, the electronic history that this correlative activity yields is configured to enable a processing device to determine the geographic location of a given response vehicle at, for example, five-second intervals within a time period of interest.

At a block 320, the electronic history is stored in a memory device. For example, once the position data has been correlated with the service provider identifiers to yield the electronic history, such history is stored in the database 240, for example.

Figure 6:
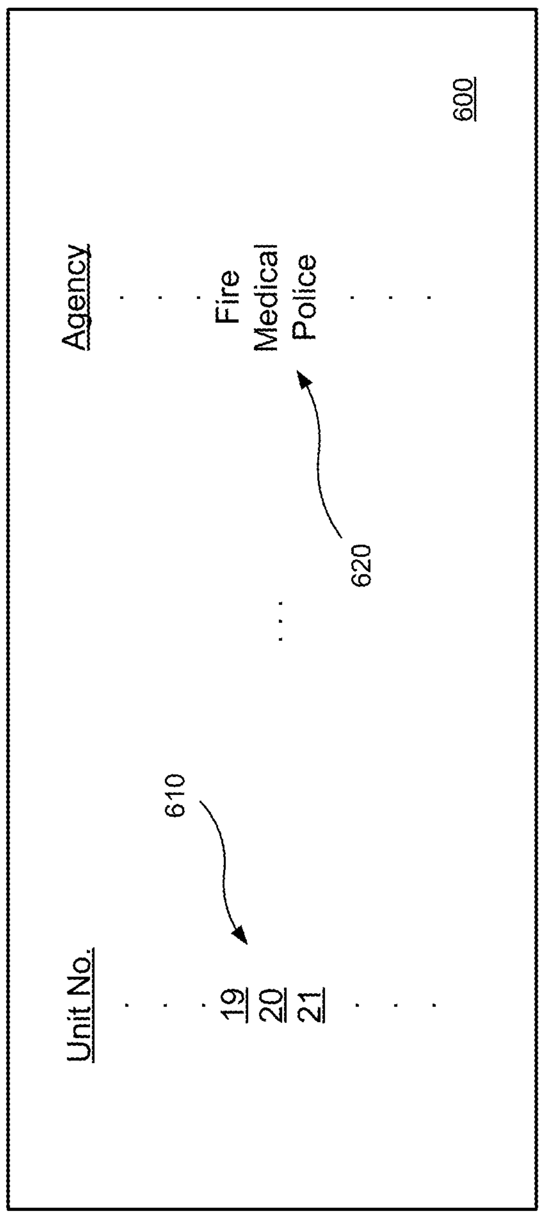
FIGS. 6-33 are screenshots illustrating functionality of one or more embodiments of the invention.

At a block 330, a user interface is generated to a display device within which is displayed a first identifier of a first service provider of the set of at least one service provider. For example, and referring to FIG. 6, the client device 210 may generate to the display 250 a menu 600 populated with user-selectable identifiers 610 of each response vehicle for which viewable tracking is available. For each identifier 610, the menu 600 may further identify the agency type 620 of the associated vehicle. Alternatively, the user interface may include a data entry field into which the user may enter, in a conventional manner, an identifier of a response vehicle for which viewable tracking is available.

At a block 340, a selection of the first service-provider identifier is received from a user via the user interface. For example, and again referring to FIG. 6, using a conventional pointer device (not shown), the user may select an identifier 610 of a response vehicle that the user wishes to track. Additionally, the user may select from the user interface a particular time period of interest (e.g., one or more days, one or more hours during a particular day, etc.), the activity of the selected response vehicle during which the user is interested in seeing. In an embodiment, this user selection of vehicle identifier and time period of interest may be transmitted to the server 230.

At a block 350, in response to the selection of the first service-provider identifier, an aerial view of a geographic region within which the first service provider was located during the time period is generated to a display device. For example, upon receiving a selection of identifier 610 and, consequently, a selection of a response vehicle of interest, the client device 210 may access the database 240, or other memory device, in which the electronic history is stored. From the electronic history, the client device 210 can determine the geographic region(s) in which the selected response vehicle was located during the selected time period of interest. Subsequently, the client device 210 can, in a conventional manner, generate to display 250 a rendering of the determined geographic region(s) using aerial map data, for example, that may be stored in database 240 or on the client device itself.

Figure 7:

At a block 360, at least one icon representing the first service provider at the geographic location corresponding to at least one time interval of the set of time intervals is displayed in the aerial view. For example, in the aerial view 700 illustrated in FIG. 7, depending on the duration of the user-selected time period of interest, one or more icons 710 illustrating the activity of the selected response vehicle are superimposed on the rendered geographic region 720 determined at block 350. In the illustrated example, a comparatively lengthy time period of interest has been selected by the user, as evidenced by the large number of icons 710 depicting a police unit's comprehensive patrol over virtually the entirety of a large island part of the region 720. Of course, in at least one embodiment, icons illustrating the movement of more than one such response vehicle may be simultaneously displayed in similar fashion in the aerial view 700.

In an embodiment, in response to user selection of an icon 710, the velocity and bearing of the vehicle at the time associated with the selected icon is displayed in the aerial view 700. Additionally, the electronic history may further comprise identifiers of dispatch calls received by one or more of the emergency response vehicles. Consequently, an icon 730 may be displayed in the aerial view 700 illustrating a geographic location of the response vehicle at a time that the response vehicle received a dispatch call.

Figure 4:
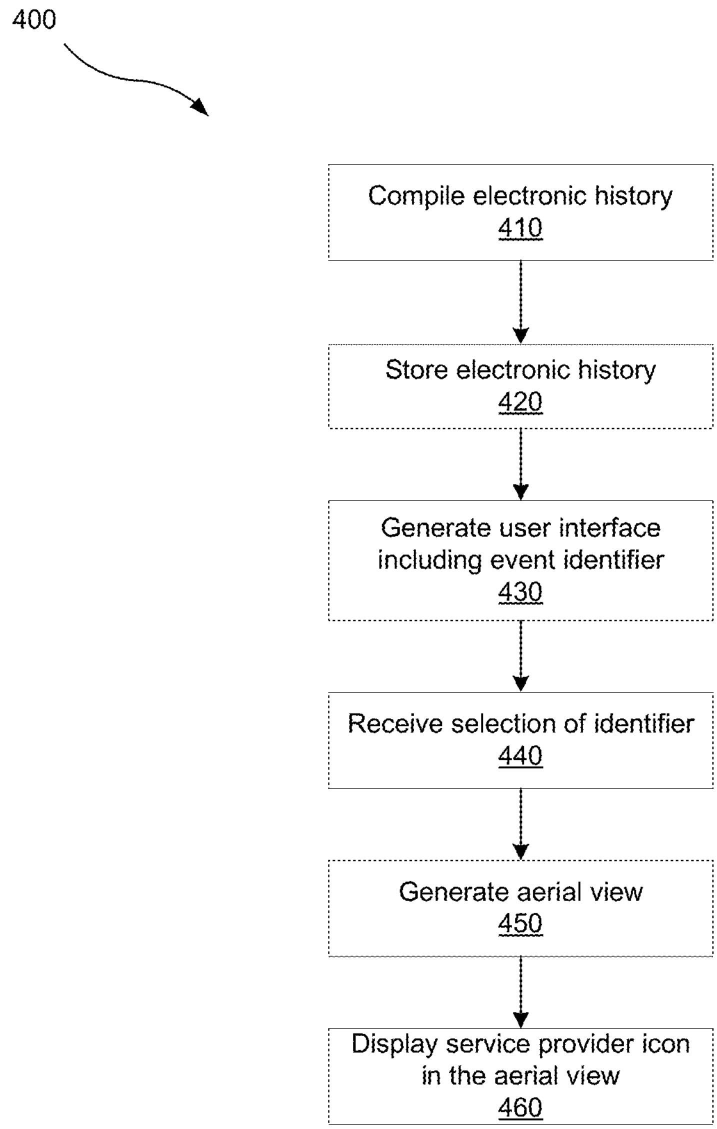

FIG. 4 illustrates a process 400, according to an embodiment of the invention, for tracking a set of at least one emergency service provider. The process 400 is illustrated as a set of operations shown as discrete blocks. One or more steps of the process 400 may be implemented in any suitable hardware, software, including instructions embodied within components, firmware, or combination thereof. The order in which the operations associated with the process 400 are described is not to be necessarily construed as a limitation.

At a block 410, an electronic history is compiled. The electronic history includes at least one identifier of a service provider, at least one identifier of an event to which the service provider responded, and GPS data identifying the geographic location of each service provider at each time interval within the duration of the event. The event is of a finite duration. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles and identifiers of and information associated with emergency-response events to which such vehicles responded. The identifiers of these response vehicles and identifiers of and information associated with emergency-response events may be stored in database 240 and/or a memory device associated with client device 210. The AVL data will typically take the form of a latitude/longitude position of the response vehicle and the time at which such vehicle is in such position. Consequently, the electronic history that this correlative activity yields is configured to enable a processing device to determine the geographic location of a given response vehicle at, for example, five-second intervals within the duration of an event. Additionally, the information stored in database 240 and/or client device 210 may further enable the inclusion in the electronic history of data identifying the geographic location of a given response vehicle at time intervals occurring prior and/or subsequent to the duration of the event. This latter feature may be implemented by, for example, employing the process 300 described above.

At a block 420, the electronic history is stored in a memory device. For example, once the position and event data has been correlated with the service provider identifiers to yield the electronic history, such history is stored in the database 240, for example.

Figure 8:
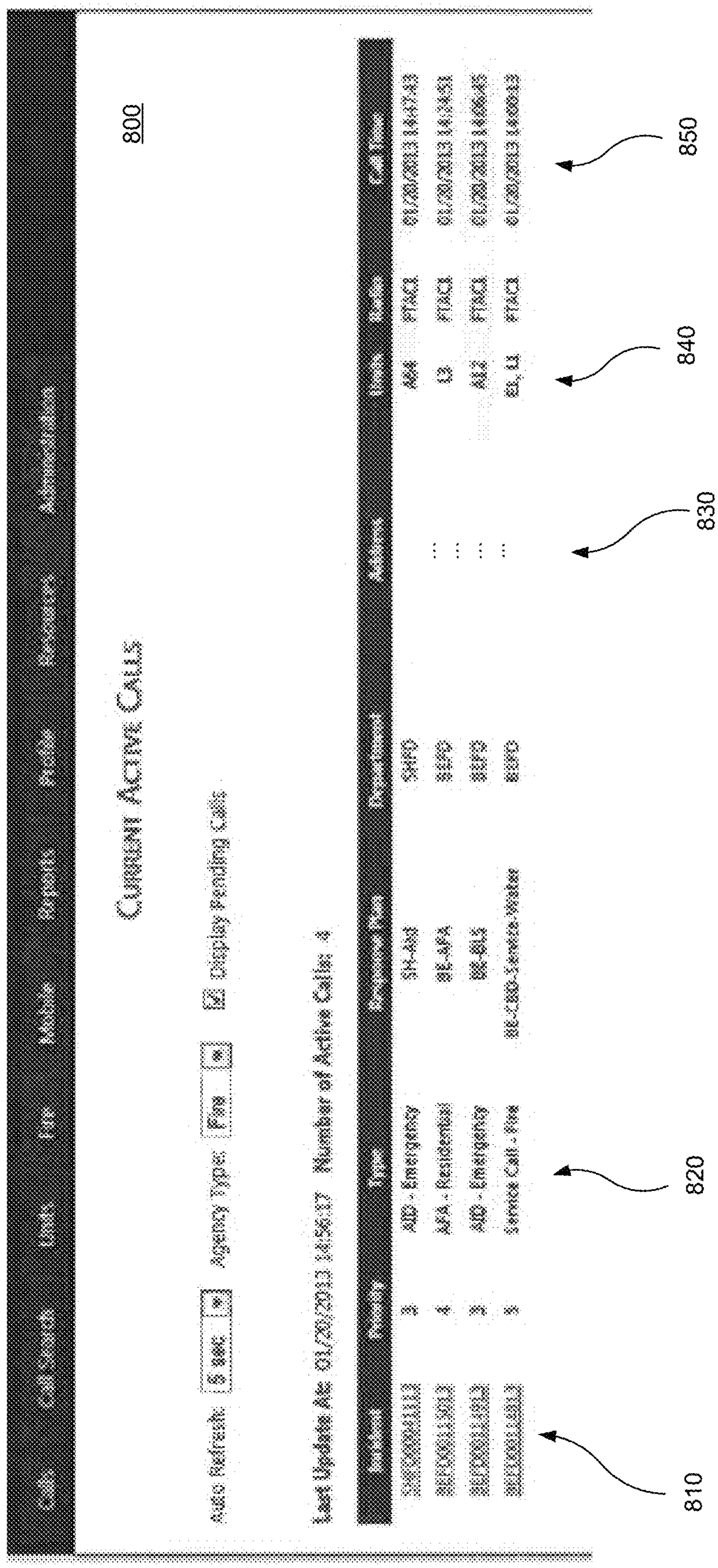

At a block 430, a user interface is generated to a display device within which is displayed a first identifier of a first event of the set of at least one event. For example, and referring to FIG. 8, the client device 210 may generate to the display 250 a menu 800 populated with user-selectable identifiers 810 of events to which response vehicles, for which viewable tracking is available, responded. For each identifier 810, the menu 800 may further display a description 820 of the event, the address 830 of the event, identifiers 840 of the response vehicles responding to the event and identifiers 850 of the date/time of the event.

At a block 440, a selection of the first event identifier is received from a user via the user interface. For example, and again referring to FIG. 8, using a conventional pointer device (not shown), the user may select an identifier 810 of an event to which response vehicles, for which viewable tracking is available, responded.

At a block 450, in response to the selection of the first event identifier, an aerial view of a geographic region within which the first event took place is generated to a display device. For example, upon receiving a selection of identifier 810 and, consequently, a selection of an event of interest, the client device 210 may access the database 240, or other memory device, in which the electronic history is stored. From the electronic history, the client device 210 can determine the geographic region in which the selected event took place. Subsequently, the client device 210 can, in a conventional manner, generate to display 250 a rendering of the determined geographic region using aerial map data, for example, that may be stored in database 240 or on the client device itself.

Figure 9:
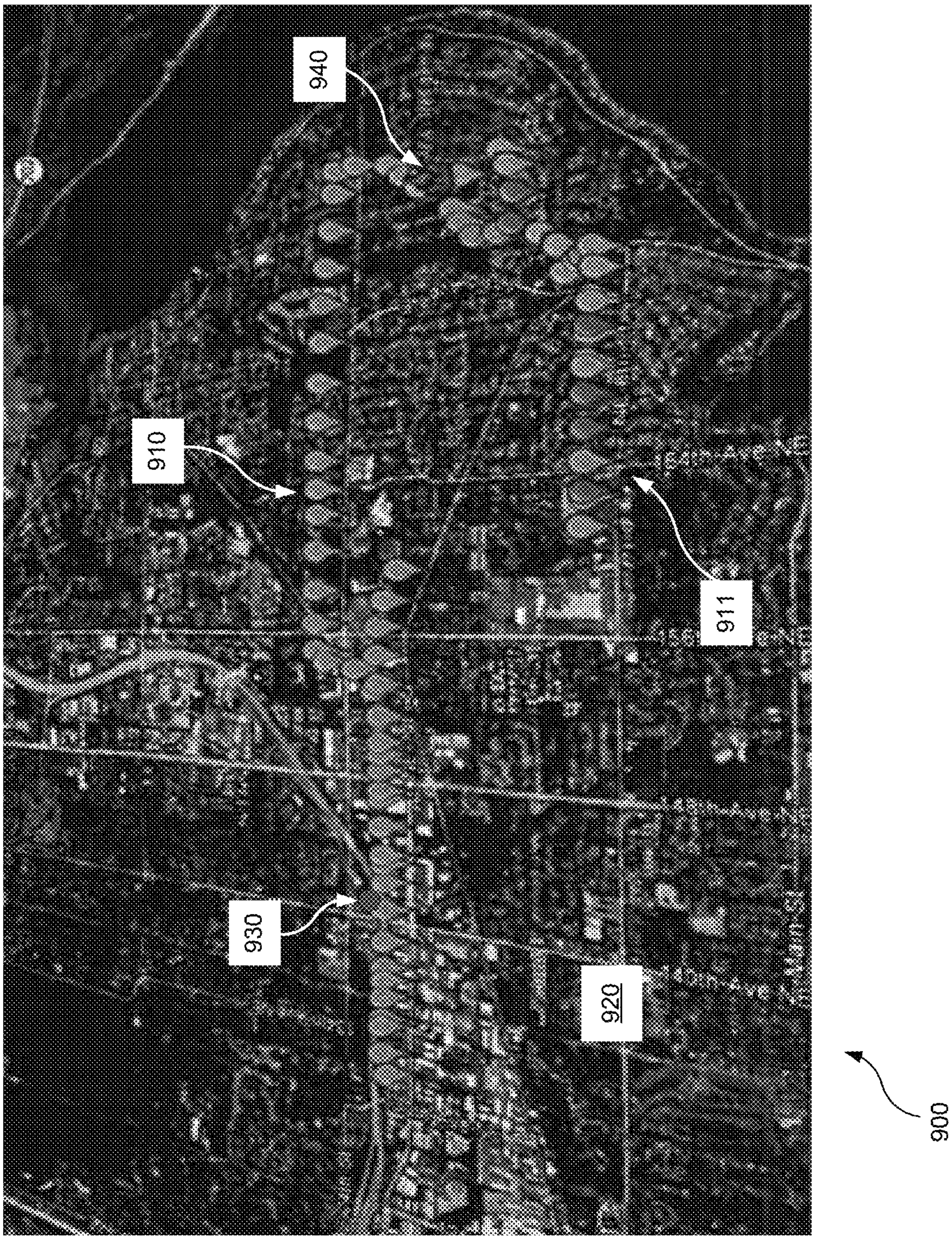

At a block 460, at least one icon representing at least one responding service provider at the geographic location corresponding to at least one time interval within the duration of the event is displayed in the aerial view. For example, as illustrated in FIG. 9, two response vehicles responded to the event selected from menu 800. Consequently, depending on the number of time intervals selected by the user for viewing, two sets of one or more icons 910, 911 illustrating the respective activity of the two response vehicles in transit to and arriving at the scene of the event are superimposed on the rendered geographic region 920 determined at block 450.

In an embodiment, in response to user selection of an icon 910, 911, the velocity and bearing of the vehicle at the time associated with the selected icon is displayed in the aerial view 900. Additionally, the electronic history may further comprise identifiers of dispatch calls received by one or more of the emergency response vehicles, as well as identifiers of one or more event locations to which such response vehicles travel in response to a dispatch call. Consequently, a call icon 930 may be displayed in the aerial view 900 illustrating a geographic location of one or more of the response vehicles at a time that such response vehicle received a dispatch call. Similarly, an event icon 940 may be displayed in the aerial view 900 illustrating the event location(s) to which such response vehicles traveled in response to a dispatch call. In an embodiment, a selection of the event icon 940 by the user may cause information about the event, such as the address of the event, time of event, the type of event, etc. to be displayed in the aerial view 900.

Figure 5:
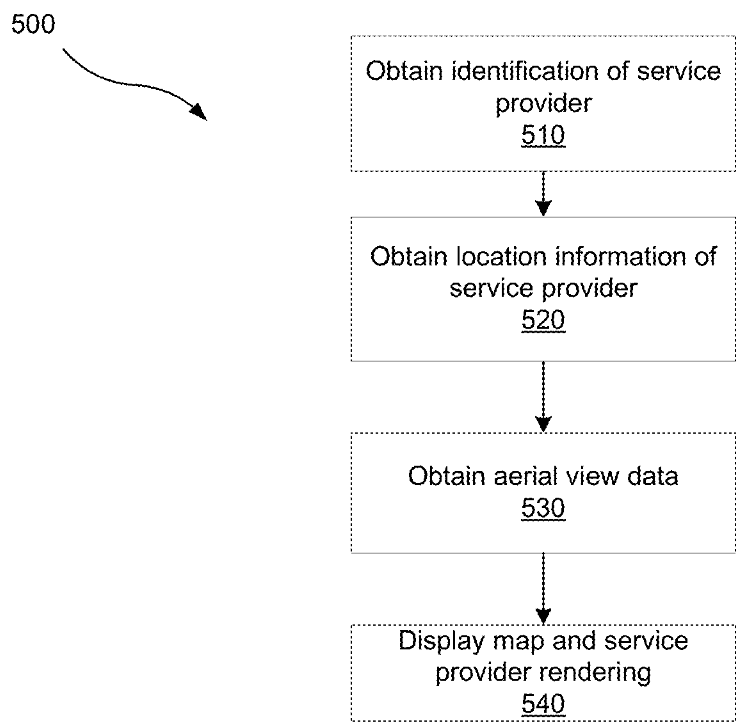

FIG. 5 illustrates a process 500, according to an embodiment of the invention. The process 500 is illustrated as a set of operations shown as discrete blocks. One or more steps of the process 500 may be implemented in any suitable hardware, software, including instructions embodied within components, firmware, or combination thereof. The order in which the operations associated with the process 500 are described is not to be necessarily construed as a limitation.

At a block 510, identification information for at least one service provider is obtained. For example, identifiers of emergency response vehicles, identical or similar to those discussed above with reference to process 300, for example, may be stored in, and accessible by server 230 and/or client device 210 from, database 240 and/or a memory device associated with the client device.

At a block 520, location information for the at least one service provider is obtained. For example, the client device 210, server 230 and/or computer system 260 may regularly (e.g., every five seconds or other predetermined time interval) receive, via network 220 or other conventional means, AVL data from transmitters in a set of emergency response vehicles and correlate this data with respective identifiers of these response vehicles that are stored in database 240 and/or client device 210. Such data will typically take the form of a latitude/longitude position of the response vehicle and the time at which such vehicle is in such position.

At a block 530, data is obtained enabling the generation to a display device of an aerial view of a geographic region in which the location information indicates the at least one service provider has been in transit. For example, the client device 210 can determine, based on the identification information and/or location information, the geographic region(s) in which a selected response vehicle was located during a given time period or, for example, a user-selected time period of interest. Subsequently, the client device 210 can, in a conventional manner, generate to display 250 a rendering of the determined geographic region(s) using aerial map data, for example, that may be stored in database 240 or on the client device itself.

Figure 10:

At a block 540, the map information is displayed overlaid with an animated rendering of the movement of the at least one service provider within the geographic region. For example, as illustrated in FIG. 10, the activity of a selected response vehicle is superimposed as a "slug trail" 1010 on the rendered geographic region 1020 determined at block 530. In an embodiment, the brighter and thicker the slug trail, the more frequently the unit drove along that particular stretch of road.

In one aspect, a system, referred to herein as Real-Time Agency Activity Display and Reporting (RAADAR), is described. RAADAR is a system and/or software designed to provide near real-time information for First Responders (Police and Fire) about the nature of the calls they are assigned to. RAADAR can provide more information than is communicated over the radio, including notes from 911 call receivers, maps, aerial imagery, automatic vehicle location and building safety information.

In some aspects, RAADAR may be a custom web-based tool designed for real time or near-real time display of information relating to active 911 calls, for example, for or across a number of different member agencies. An important aspect of RAADAR, as distinguished from prior systems, is that it can provide users real-time updates to 911 calls in progress.

Use of RAADAR may require a user to have a valid login into the web site. RAADAR does not allow users to self-register; users need to be pre-approved by agency administrative staff before they are given access to RAADAR. Once a user has a valid RAADAR login, they are able to see active 911 calls for the agencies they have been given permission to view. RAADAR offers per-agency filtering on a per-user basis so that a user can see some, all or none of member agencies. Users can also be filtered between Police and Fire so that they do not see calls from the other discipline.

Once in RAADAR, calls can be opened and more details seen. Details include the unit(s) assigned to the call, their status, a map of the call location and where the units assigned to the call are at and a scrolling list of comments from 911 call receivers and dispatchers. Static information is also displayed that can include PrePlan information (building safety for fire personnel), Response Plan information (resource assignments for fire agencies), caution notes, location name, address, person name, phone number, latitude and longitude. RAADAR also has a Call Search feature that allows users to search for calls on a number of criteria.

RAADAR may include a software application, for example, created or programmed using Microsoft ASP .NET and Visual C# programming languages. The application may run as a custom web site that is available to anyone with a valid login and an Internet connection. In some cases, RAADAR may be designed specifically to be run as a web site. The preferred application is to run RAADAR on a Microsoft Windows Server using Internet Information Services to serve end users.

In one aspect, RAADAR consists of many Active Server Pages (ASP) and custom computer executable code libraries (e.g., totaling 32,975 lines of C# code). Version Control may, in some cases, be maintained with Microsoft's Team Foundation Server. RAADAR's functionality is driven by custom code libraries. Some of the functions of these libraries include the following.

RAADAR can independently connect to 25 different databases on 15 distinct Microsoft SQL database servers. Custom libraries may retrieve the data and convert it to a common format for display to the end user.

The described system can create on-the-fly active server pages to display the data to the end user. The described system can connect to a Windows File server to retrieve saved audio files (911 call and radio audio). The saved audio files can be converted to MP3 files via another custom library before they are downloaded to the end user.

The described system can connect to the Tyler Mobile Server to retrieve XML files associated with Mobile Field Reports. These files are parsed and appropriate data is displayed to the end user in the form of a SAP Crystal Report. Additional code in RAADAR enables the Crystal Report to be saved as an Excel spreadsheet or PDF document. A code library may connect to the Snohomish County Emergency Radio System (SERS) and sends pages to specified SERS.

Custom libraries enable the end user to search for calls on a variety of different criteria (partial address, agency, call type, date range, etc.). Libraries can be used to control what features of RAADAR users see. There are many roles defined for users; each role allows them access to a different feature in RAADAR. Custom libraries also connect to external agencies, and can retrieve call data and integrate it seamlessly into the user interface. Custom libraries can also retrieve unit AVL data and format it into a file suitable for displaying in Google Earth, or other mapping or similar visualization application. This file is downloaded to the end user and can be used for several purposes, such as to evaluate where a given unit was during a certain timeframe, observing the routes taken by emergency services personnel to an incident, evaluating patrol patterns to determine if neighborhoods in a jurisdiction are being adequately covered, or for incident commanders ensuring that a perimeter has been adequately set up or if more resources are needed. Custom libraries can also be used also determine which live stream to connect to on a given call if a user is authorized to listen to real time radio traffic.

Specific features of RAADAR include utilizing Ajax technology to only refresh parts of web pages that have changed. This results in incredibly fast refreshes of information displayed by RAADAR.

RAADAR can display all calls being dispatched by a 911 center regardless of CAD system in use, such that two CAD systems nay be in use from two different vendors (Tyler Technologies and TriTech Systems). Both CAD systems are highly dissimilar in look-and-feel, functionality and purpose. Further, each CAD's database architecture is vastly different and incompatible with each other. RAADAR is able to gather data from both CAD systems and display it in the same user interface to the end user. The end user does not know that there are two different CAD systems—the only difference the end user sees is color-scheme changes for police vs. fire incidents.

RAADAR also has the ability to generate KML files from AVL (Automatic Vehicle Location) data which can be displayed in Google Earth. This KML data is also animated so command staff can evaluate the routes taking by First Responders enroute to an incident. Other uses for the KML files would be to evaluate patrol patterns in a given neighborhood/district/patrol shift. Patterns can be evaluated to see if patrols should be increased in a given area or if patrols are evenly distributed across their assigned area.

In some aspects, RAADAR may be enhanced to include real-time radio traffic. This allows agency command staff the ability to listen to radio traffic outside of the 800 MHz coverage area. Command staff that are not involved in the incident can now listen to radio traffic and be informed of actions by field personnel as they happen.

In addition, a new enhancement to RAADAR allows it to link to recordings of the 911 call and radio traffic associated with an incident. This gives Public Records staff and agency prosecutors instant access to recordings without requiring using a separate application to search for the recordings in question.

In some aspects, one or more of the features described herein may be used in conjunction with one or more aspects of the system and techniques describe in related U.S. patent application Ser. No. 14/213,995, which is included at the end of this application. The features described herein may integrate with, utilize various aspects of, or in essence run on top of or in addition to the systems described in U.S. patent application Ser. No. 14/213,995.

The described systems and software may provide real-time information to First Responders in a unified format regardless of the Computer-Aided Dispatch (CAD) system used by the 911 dispatch center. RAADAR gathers CAD data directly from databases and presents it to the end user in a unified user interface. RAADAR may provide First Responders more information about the nature of 911 calls and events they are responding to. This information goes beyond what can be transmitted over the radio and includes notes from the call receiver (information gathered from the individual calling 911), maps, aerial imagery, automatic vehicle location, vehicle mapping, agency resource status, and numerous reporting tools.

TriTech Systems has a similar product named Visinet. Visinet does not provide the same level of real-time information, does not update automatically, and does not integrate data from disparate CAD systems. However, TriTech Visinet Web Browser does not meet the same purpose as RAADAR. Visinet is more of a reporting tool for after-incident use whereas RAADAR is targeted at getting information to users in real-time.

Tyler Technologies also has a similar product named CAD WebView. It is a basic web interface that provides minimal information to end users. CAD WebView appears to be more of a porting of Tyler's Aegis Mobile software application to a web format. CAD WebView also is not able to aggregate CAD data from disparate sources and display it in a common user interface. However, Tyler's CAD WebView has relied on a third-party display tool that is unstable and buggy. During testing and evaluation of CAD WebView in 2011, users found it to be unstable, limited, and ultimately unusable. Issues cited included disliking the user interface and hard-coded limits on searching in addition to instability problems.

Features according to one or more embodiments may include the following:

Police and Fire Reports and Redaction

Feature set capability allows users to pull up active call information. Additional capability allows user to pull a pre-formatted report of the call or provide a redacted report for public records requests, which strips the call of all protected or personal data not eligible for public records requests.

Agency Paging Capabilities

Figure 11:
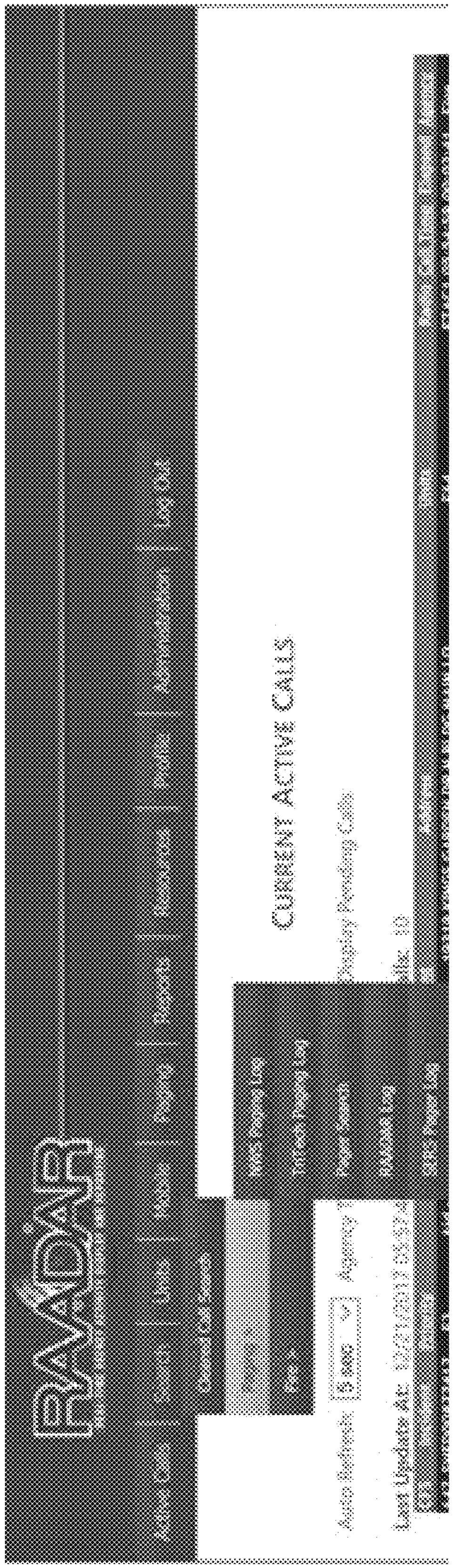
Figure 12:
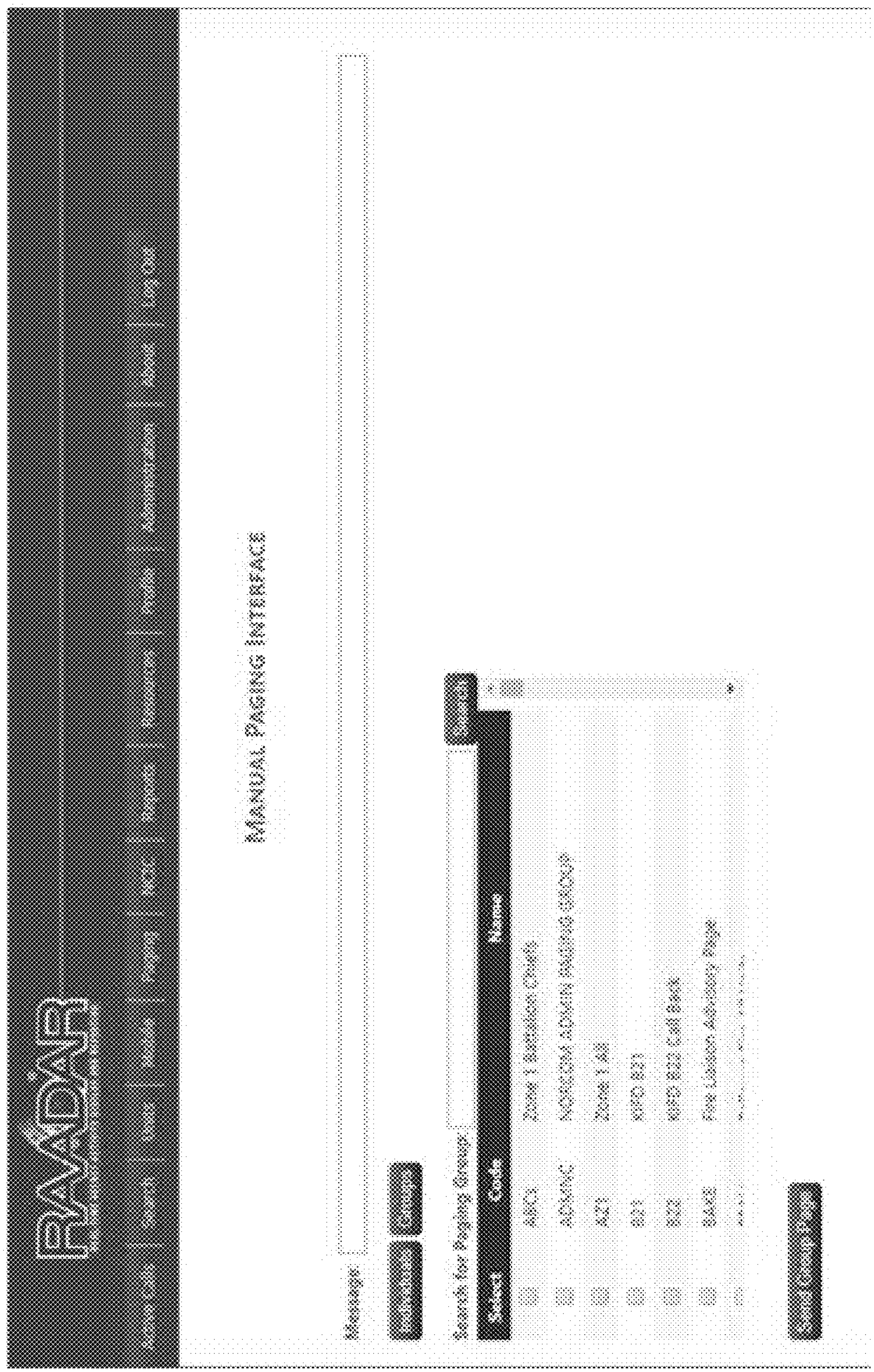

Feature set capability allows RAADAR to integrate paging logs (FIG. 11), manual and group paging (FIG. 12) capabilities within RAADAR to report pages sent from RAADAR and to send mass notification to emergency services personnel from RAADAR. Paging groups are predefined based on agency and organizational need and access security is provided through RAADAR application layer security.

Active Call to Active 911 Phone and Radio Recording Capability

Figure 13:
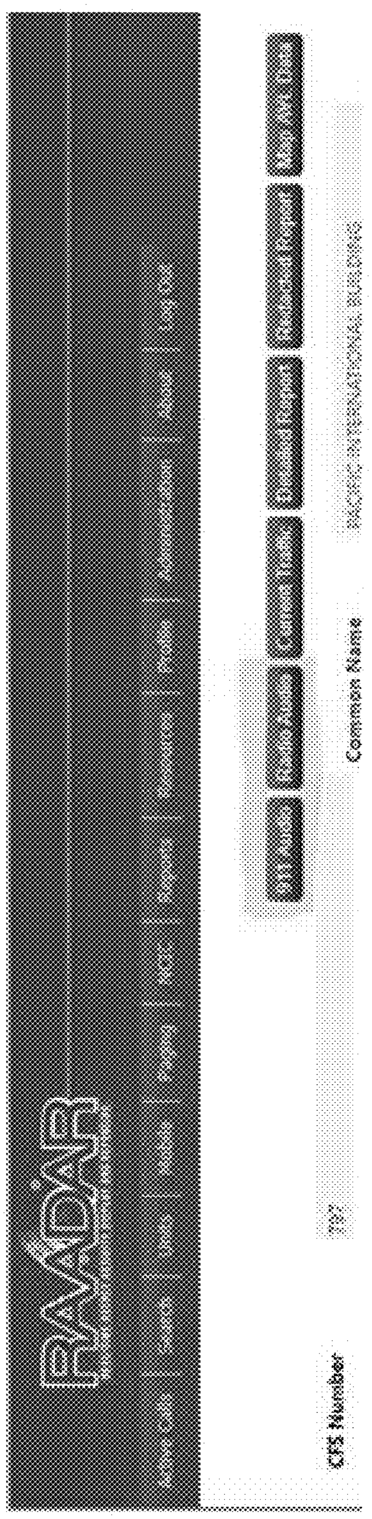

Feature set capability allows RAADAR to pull active call, in-progress call information and link call to voice and radio information related to the call (FIG. 13). The enhancement enables users, administrative review, prosecutor review, and public records specialists the capability to use RAADAR to collect call information in one place. RAADAR links CAD/911 information to another system which logs all voice and radio traffic specific to the incident event.

Active Call and Live Streaming Radio

Figure 14:
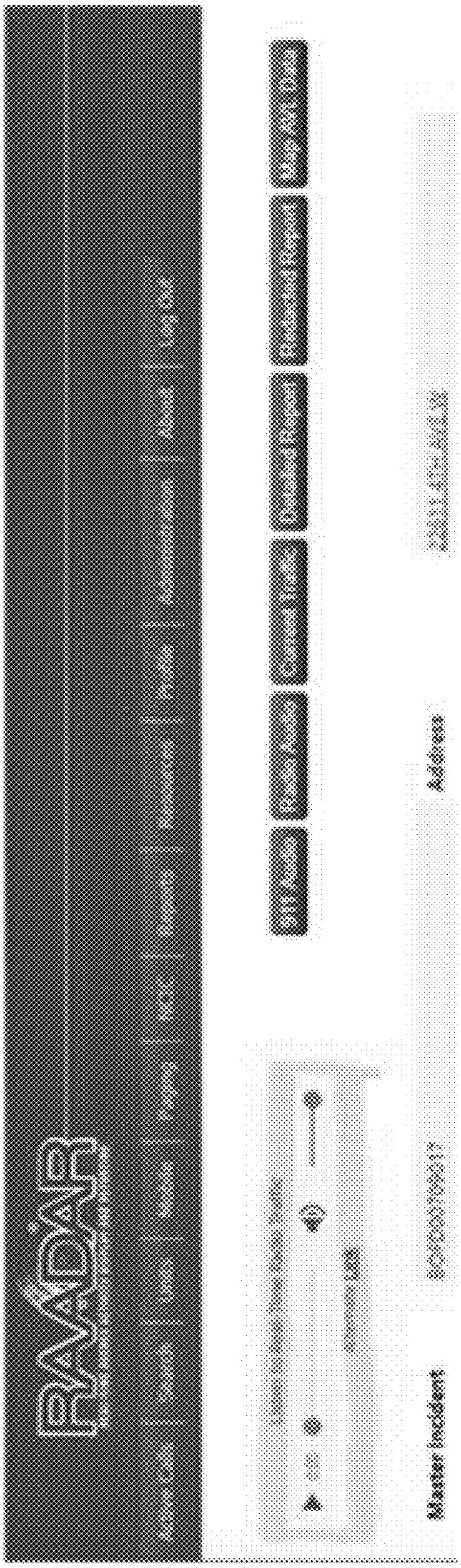

Feature set capability allows RAADAR to stream audio traffic from live radio events through the integration of trunk tracking scanner hardware directly connected to a server which RAADAR can access (FIG. 14). A "live" 911 call or incident can be tracked and radio traffic to the field units can be listened to via internet and monitored "live" as the event is occurring, while also monitoring field and dispatch notes via RAADAR interface and unit history reporting.

Link to Fire Response Plans

Figure 15A:
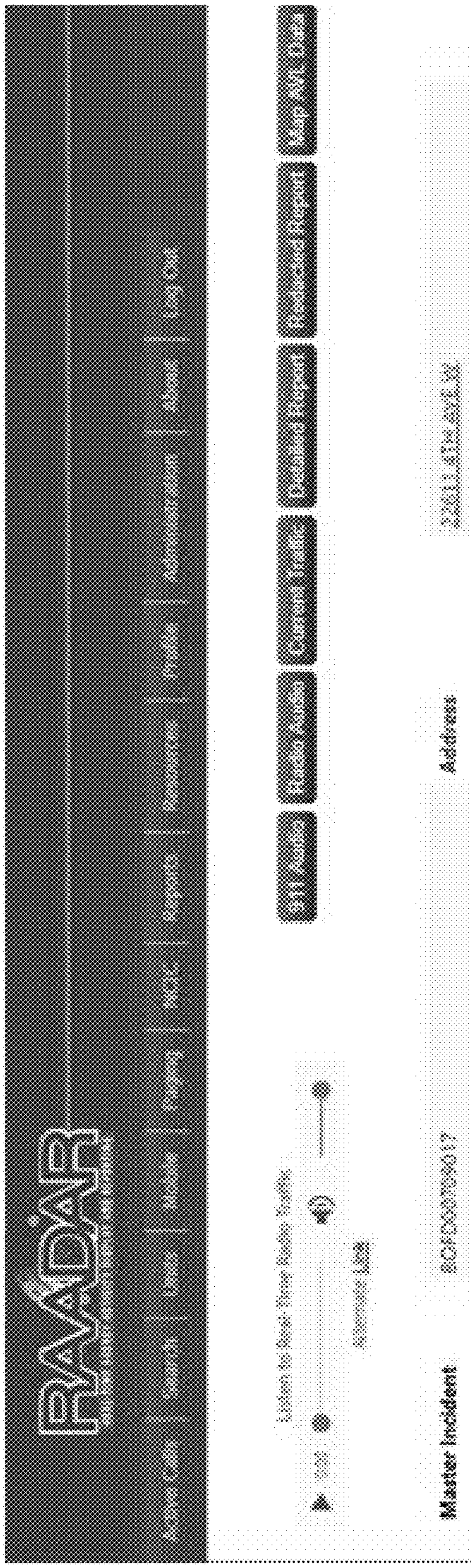
Figure 15B:

Allows RAADAR to display a link to the Fire Agency Response Plans for a given address. A "live" 911 call or incident can be tracked by units in the field and a response plan can be viewed by incident commanders showing what resources a given problem nature requires (FIGS. 15A and 15B).

Link to PrePlan Documents

Figure 16A:
Figure 16B:
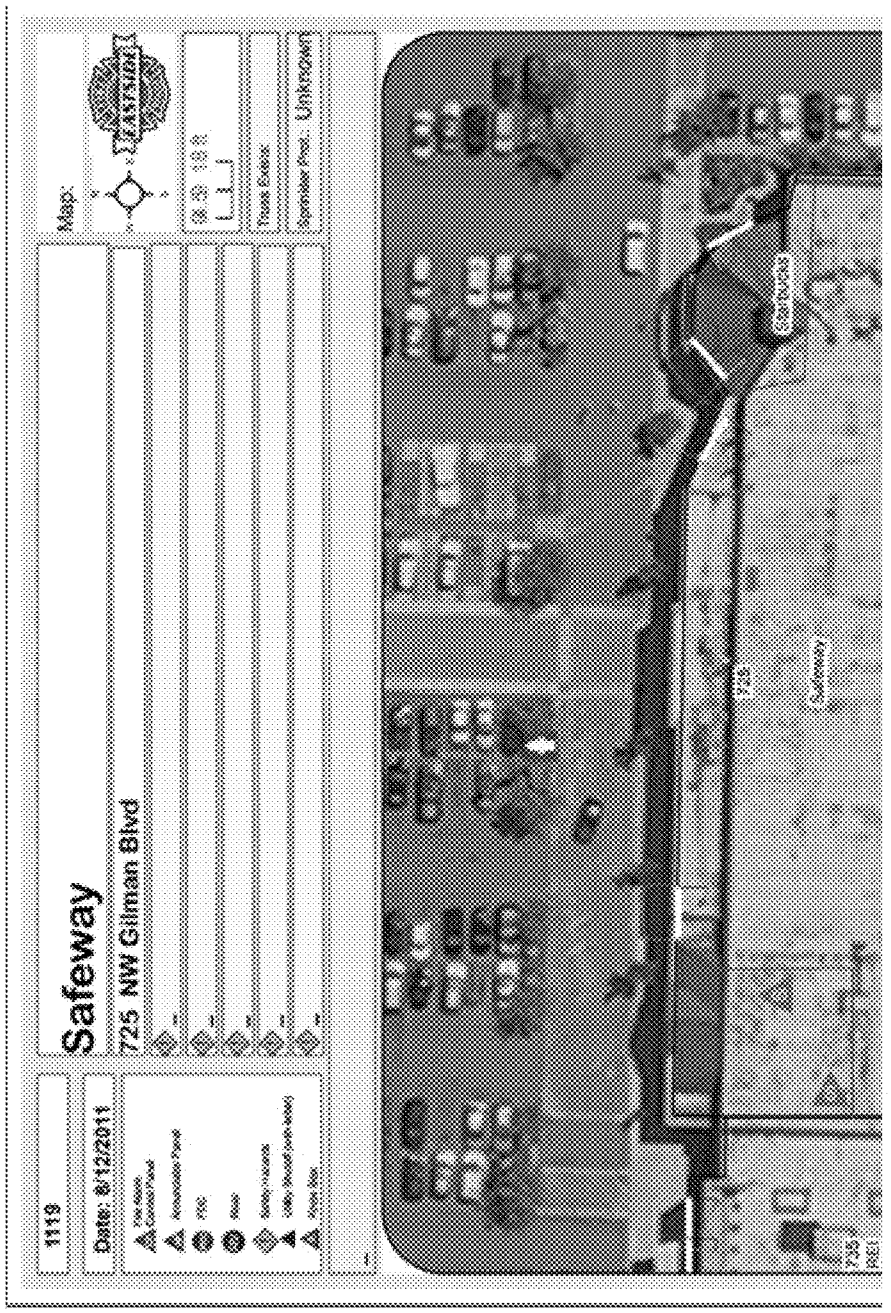

RAADAR includes a link to the Fire Agency Response PrePlan document(s) for a given address. A "live" 911 call or incident can be tracked by units in the field and a building safety plan can be viewed by incident commanders (FIGS. 16A and 16B).

Current Traffic Report

Figure 17A:
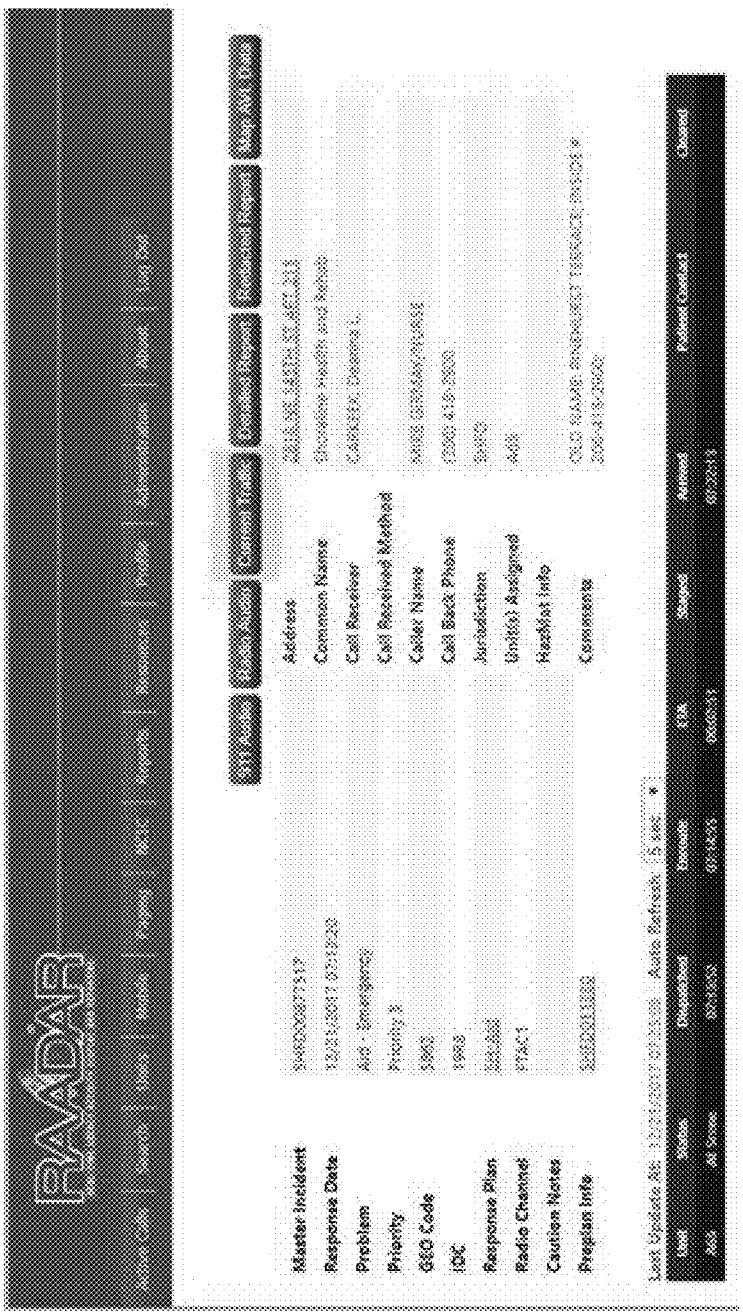
Figure 17B:
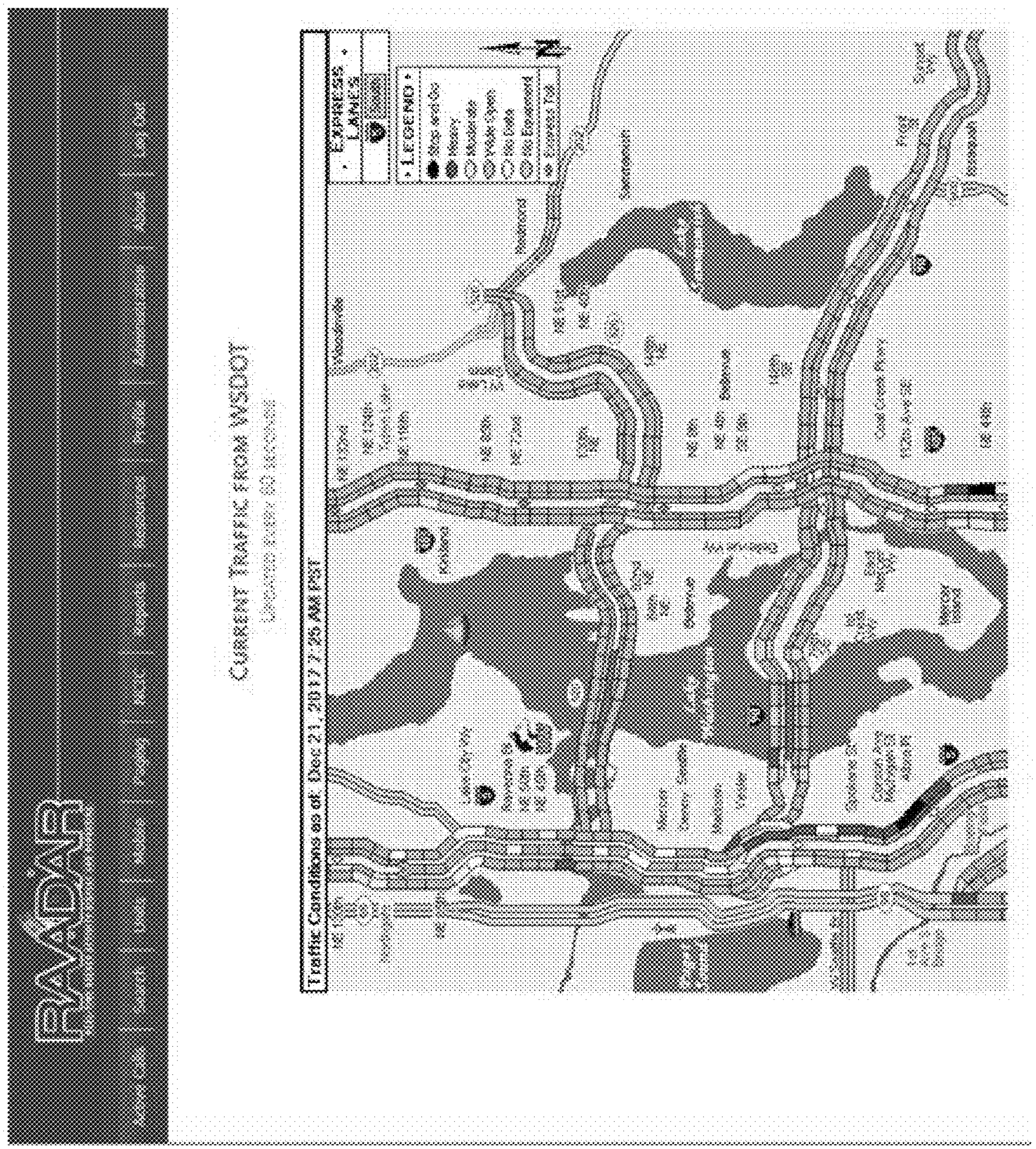

RAADAR links to the WSDOT web site to display the latest traffic map for area freeways. This allows first responders to choose the best route to a given location e.g. medic unit transporting to Level 1 Trauma Center (FIGS. 17A and 17B).

Zone 1 Resource Availability

Figure 18:
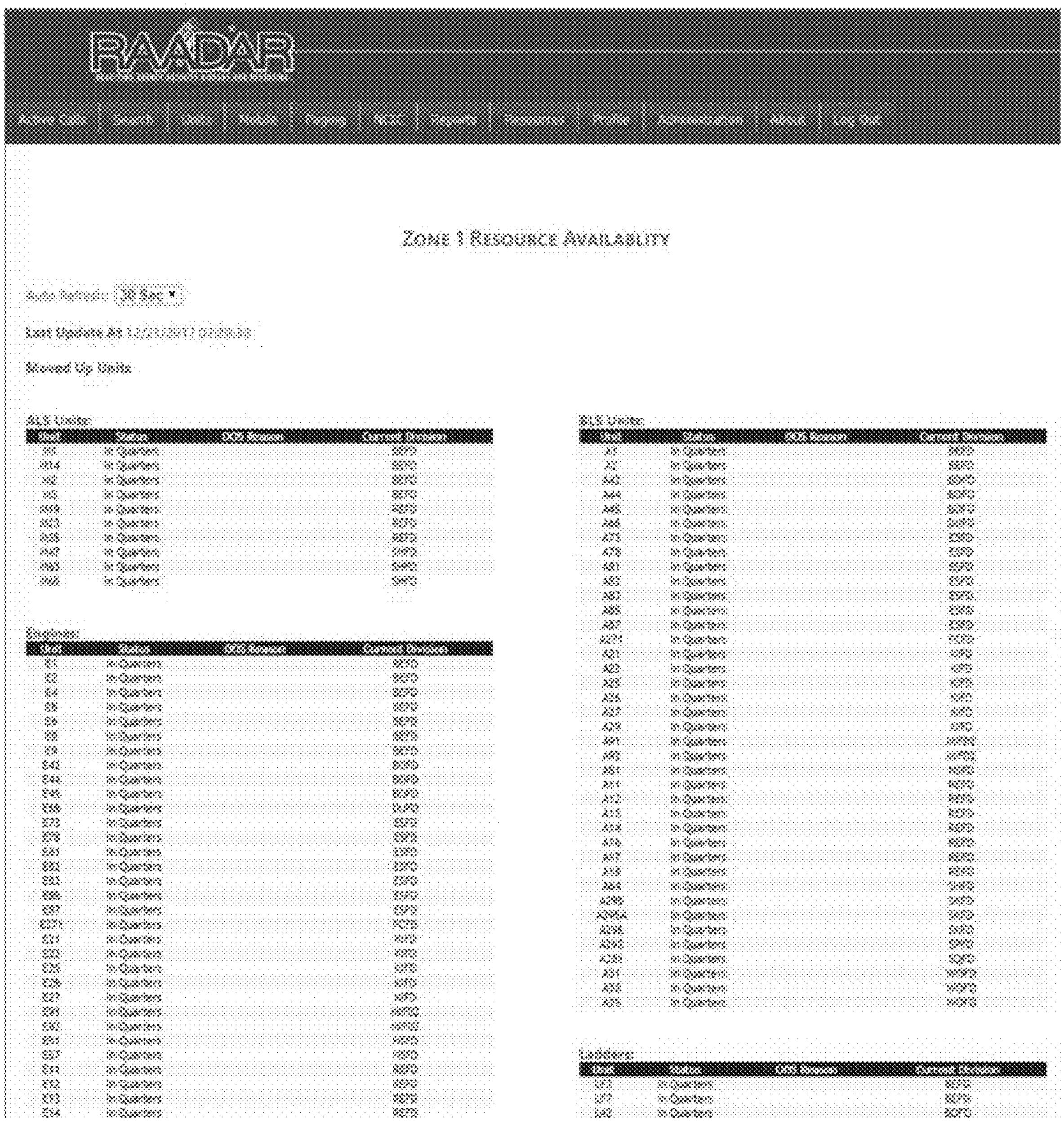

From a single page in RAADAR, fire agency command staff can get a quick overview of resource allocation across a zone. This may include displaying units that are in quarters, have been moved up to another station to provide coverage, are out of service or are assigned to an incident (FIG. 18).

Mobile Report Viewer

Figure 19A:
Figure 19B:
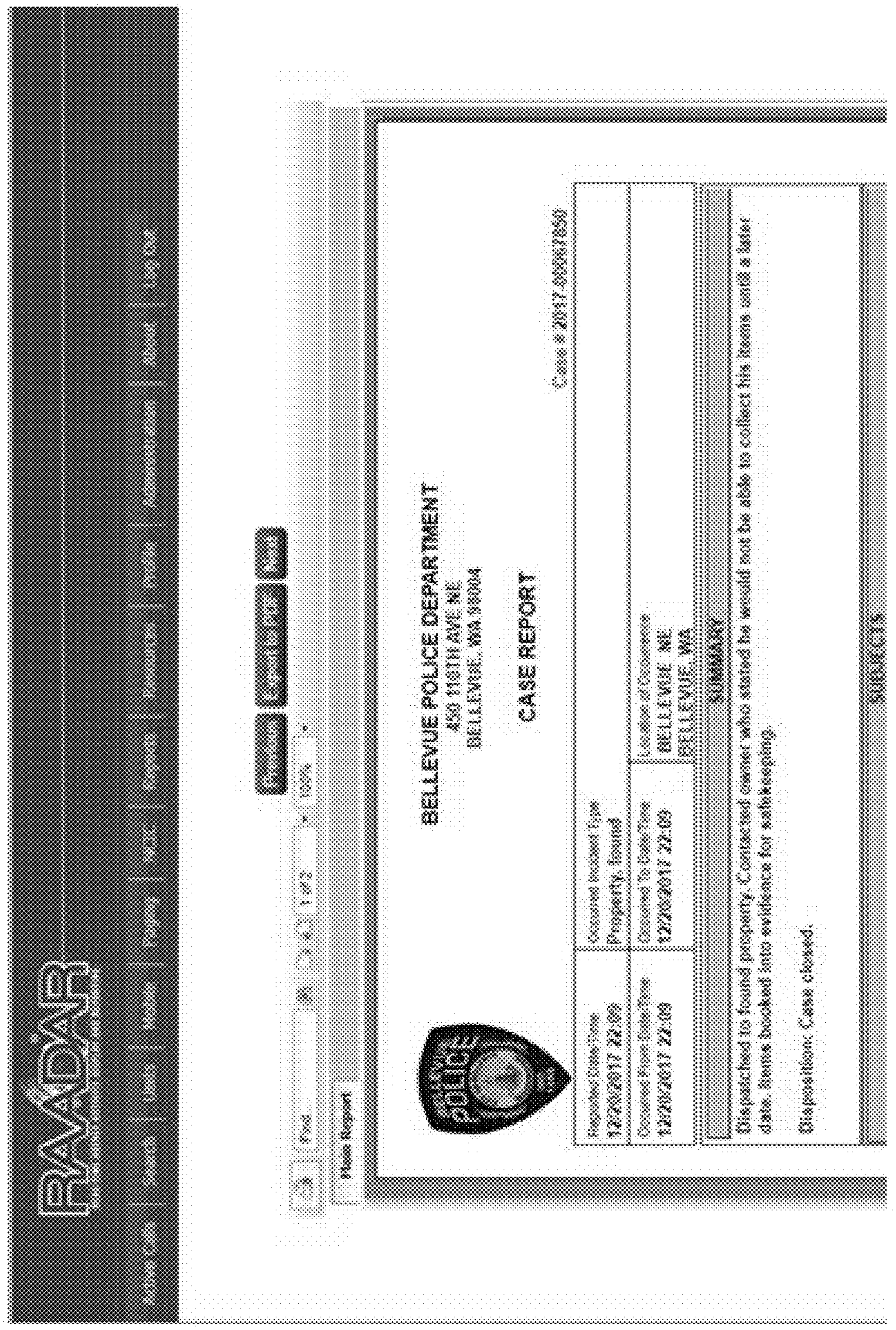

RAADAR allows Police Records Staff to see field reports being created by patrol staff. This allows Records Staff and Crime Analysts to see field reports as they are being worked on from any computer (FIGS. 19A and 19B).

Chat Audit

Figure 20:

Allows supervisory staff to review chat messages sent between dispatchers and/or mobile field units (FIG. 20).

Call Alerts

Figure 21:
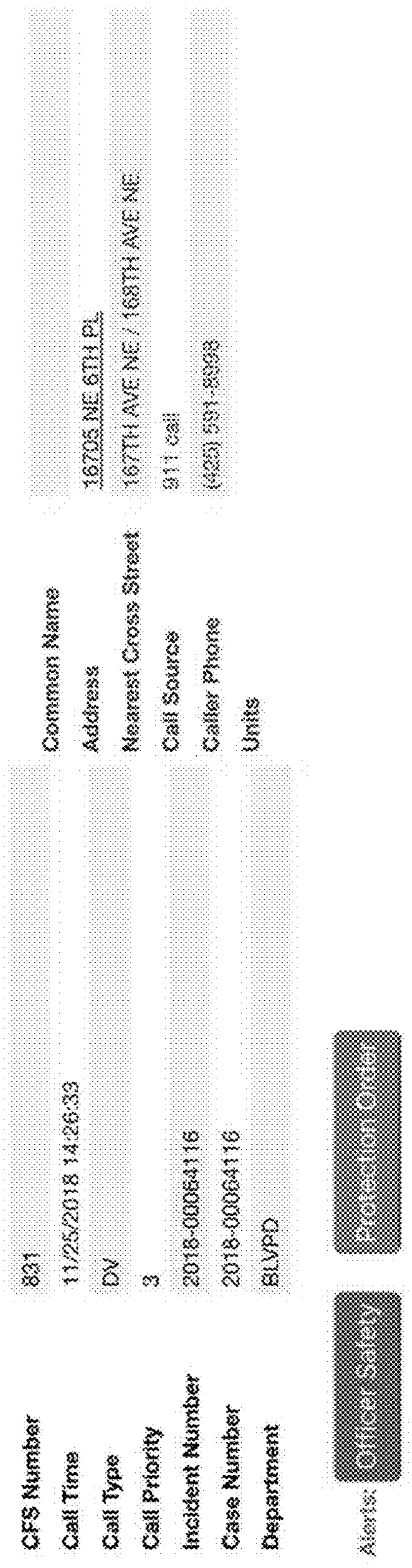

RAADAR checks for active alerts associated with a given Call for Service. If RAADAR finds an active Order of Protection, Officer Safety or Stolen Vehicle alert, an appropriate button will appear in the Call Details page as illustrated in FIG. 21.

Figure 22:
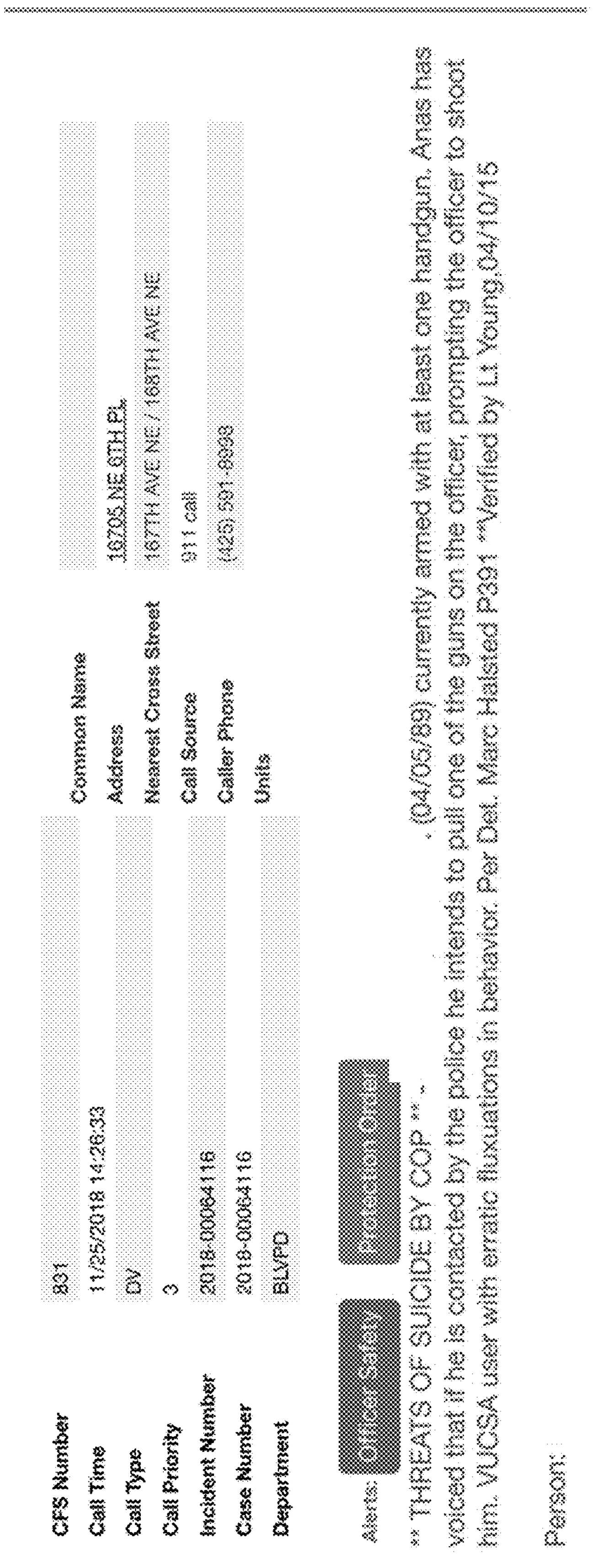

Clicking on the button will display the text of the alert as illustrated in FIG. 22.

Electronic Personnel Accountability Safety System (ePASS)

The implementation of ePASS in RAADAR is meant to enhance information available to Fire Agency Incident Commanders and is a replacement for a manual system consisting of Velcro radio ID numbers and apparatus designators.

Personnel Profile

Figure 23:
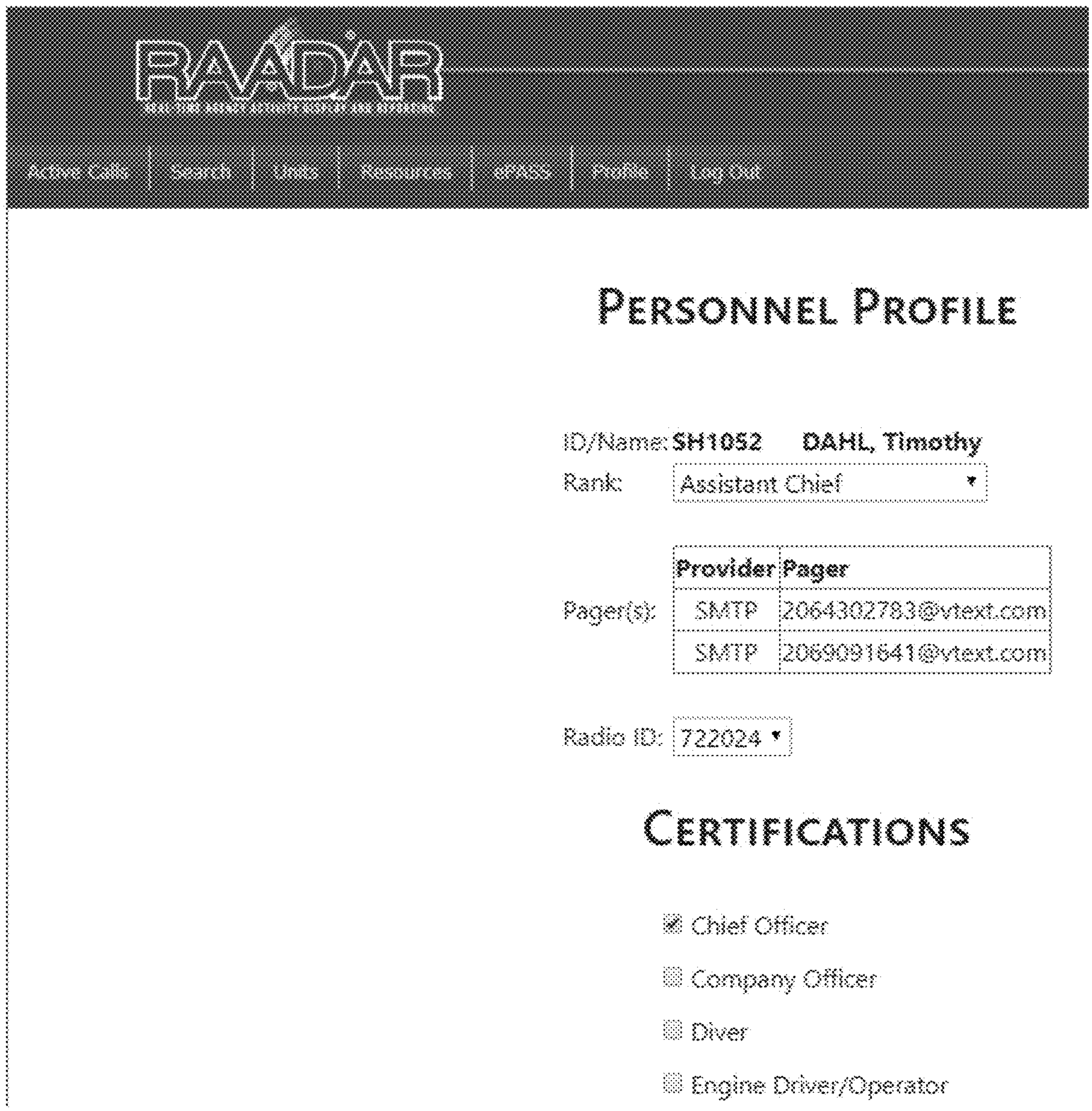

A new Personnel Profile page has been created in RAADAR to track information related to the position the fire personnel holds. These include assigned RadioIDs, pager(s), rank and certifications as illustrated in FIG. 23.

Passport Radio Assignments

The designated ePASS officer is able to assign radio IDs and personnel to the various positions on a given apparatus.

Figure 24:
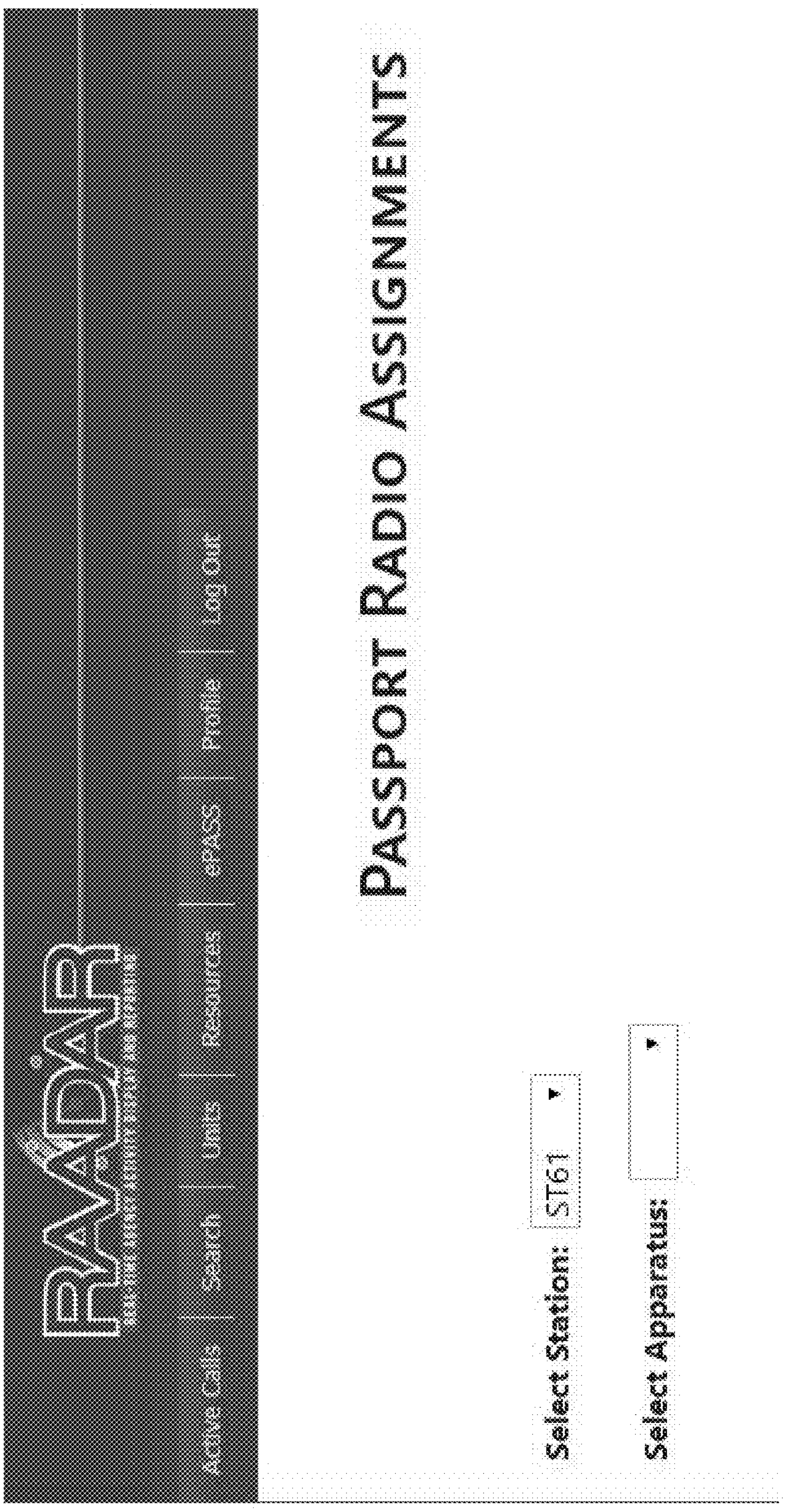

From the Radio Assignments page, the officer first selects the fire station he's working at. The stations are filtered to only display the officer's home agency stations (e.g., a Shoreline FD user will not see Bellevue FD stations) as illustrated in FIG. 24.

Figure 25:

Next, he selects the apparatus to assign personnel to as illustrated in FIG. 25.

Figure 26:
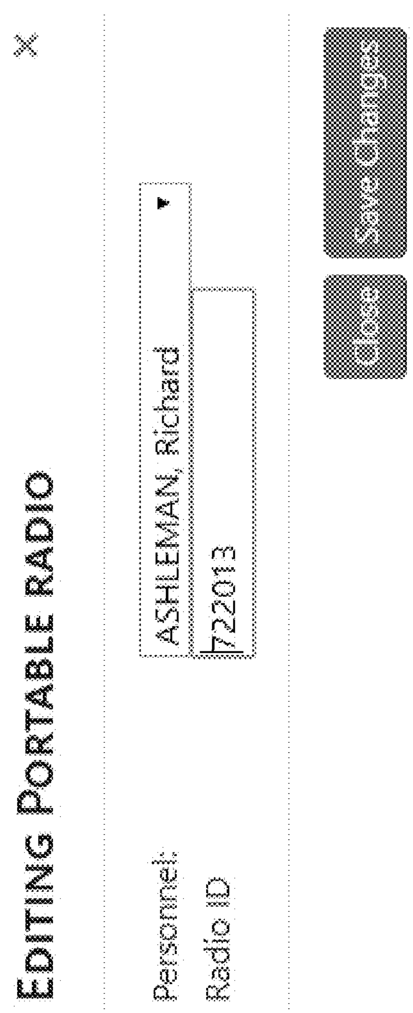

By clicking on one of the Radio ID entries, a new window opens up allowing the officer to modify the assignment as illustrated in FIG. 26.

Figure 27:
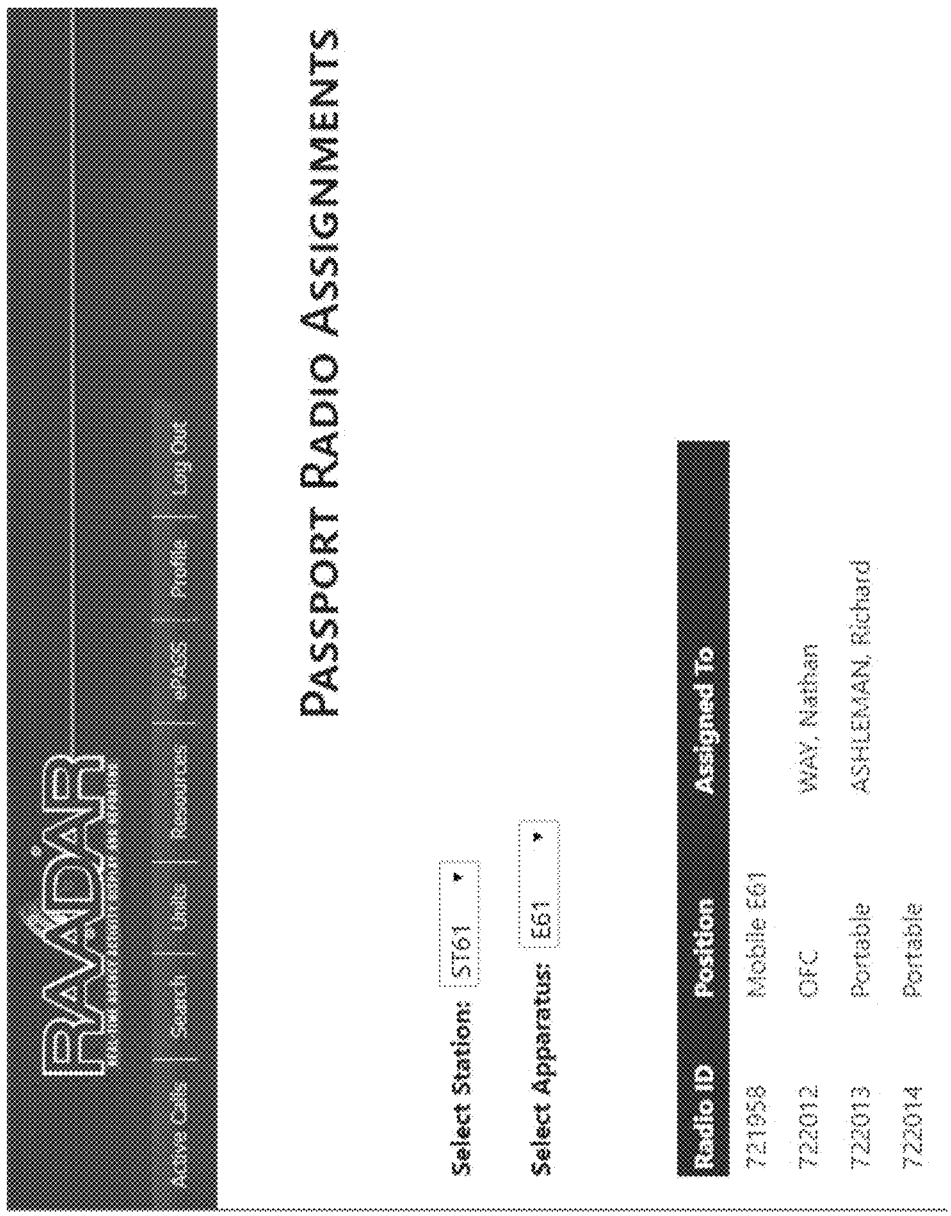

The Personnel drop-down is filtered to agency personnel. Radio IDs can be changed from this page and will be saved in the database as illustrated in FIG. 27.

Incident Command

A new Incident Command page is available to designated agency Incident Commanders. Typically, these are Battalion Chiefs.

Figure 28:
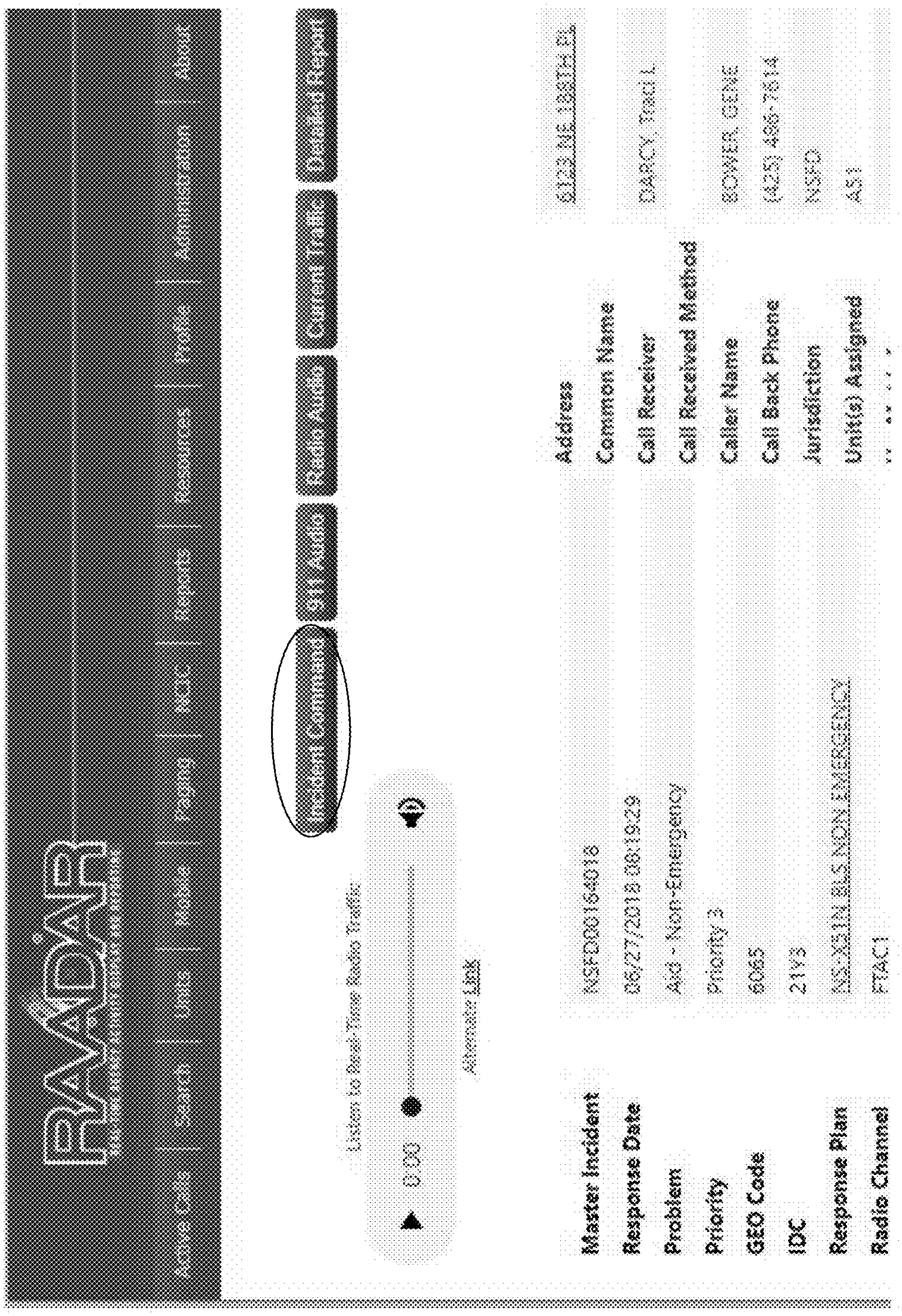

From the Call Details page, the Commander clicks the Incident Command button to access the Incident Command page as illustrated in FIG. 28.

The Incident Command page includes two timers—Call Timer which calculates the elapsed time since the call was created in CAD and 1st OnScene Timer which calculates the elapsed time since the first unit arrived on scene.

Figure 29:
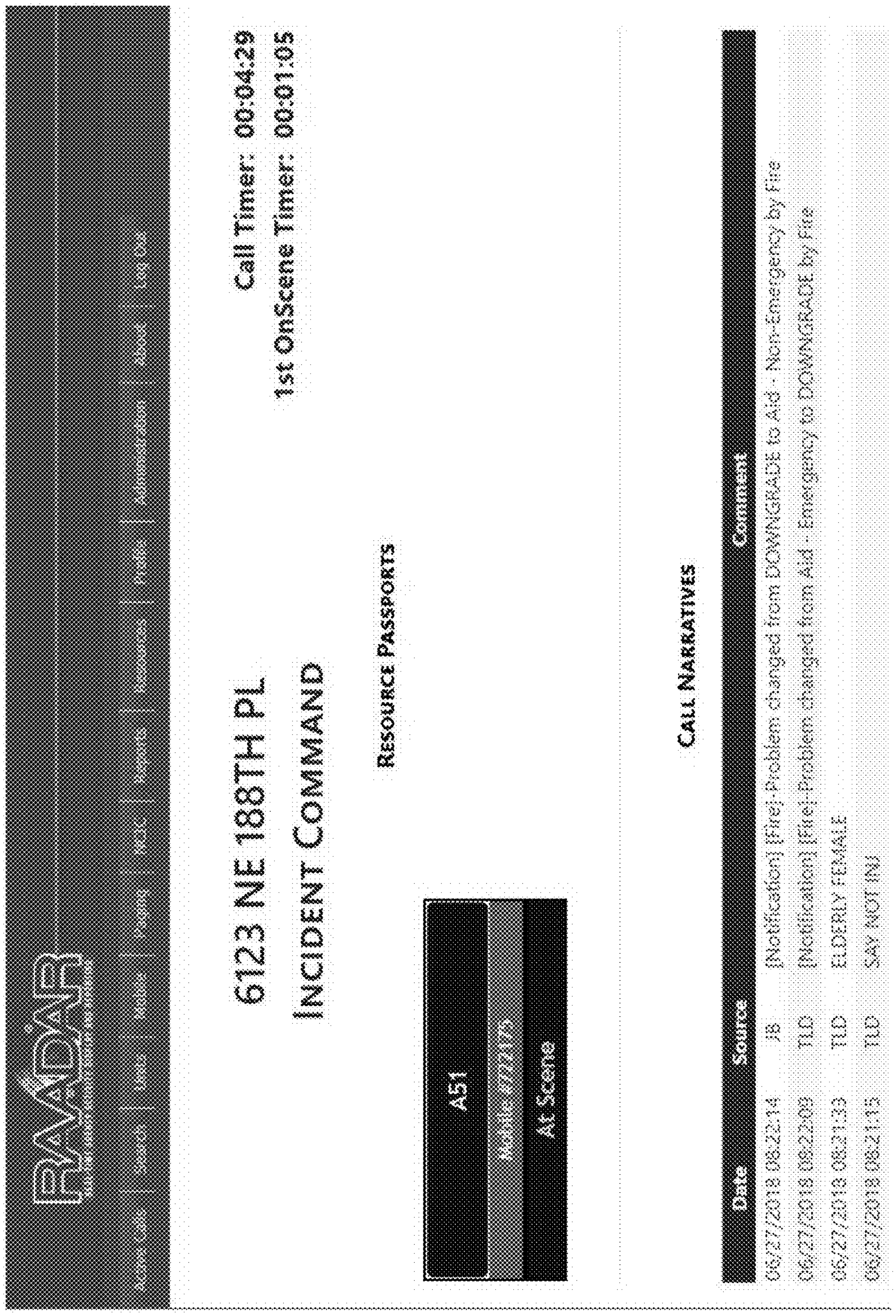

The address of the incident is prominently displayed at the top of the page. Below that are the Resource Passports. These are displayed for each unit assigned to the call as illustrated in FIG. 29.

Resource Passports

The Resource Passports are dynamically added/removed from the page based on resources assigned to the incident. The passports are color-coded and sorted by apparatus type: First are Engines, followed by Ladders/Light Force, Battalion Chiefs, Medics, MSO, Aid and finally other support resources. The bottom of the passport is color-coded based on the unit's status (Dispatched/En Route/At Scene/Transporting). A further sort is done in each classification of unit based on the CAD-calculated ETA.

Figure 30:
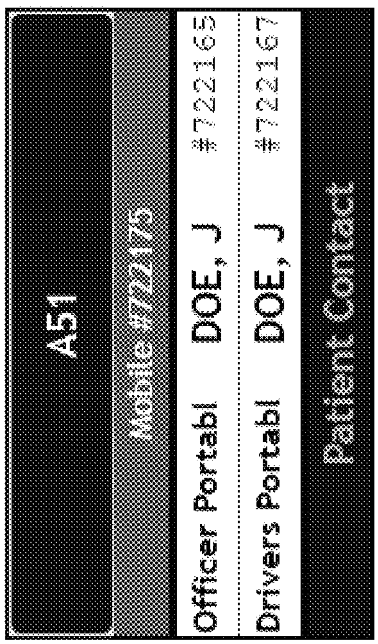

Clicking on the Apparatus Name will expand the passport to reveal the Radio IDs and personnel assigned to the apparatus as illustrated in FIG. 30.

Note that the passport will automatically contract back to the compact display after 30 seconds.

Call Narratives

These are the narratives as entered by call receivers and/or dispatchers at NORCOM. This list updates in near real-time and the newest entries are on top.

Emergency Radio Activations

Figure 31:
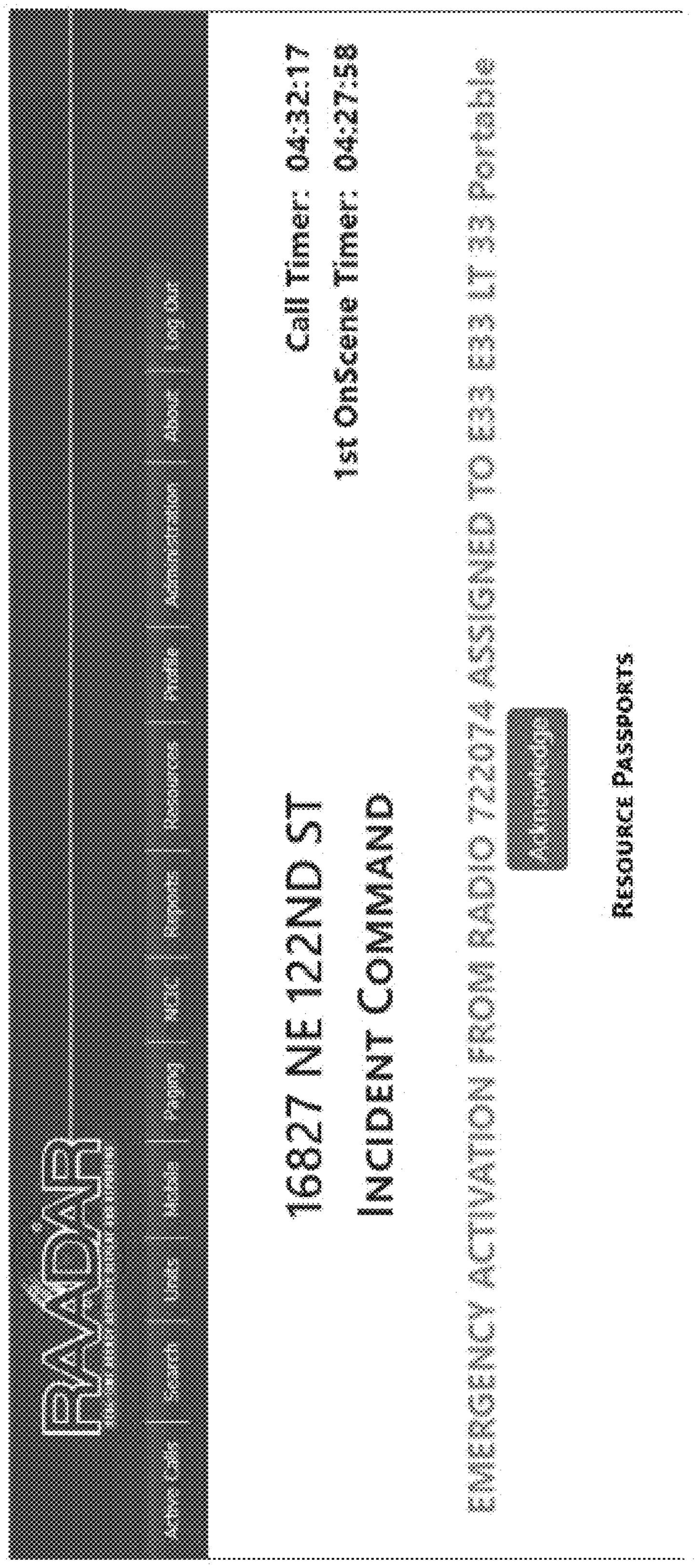

RAADAR is constantly watching for a CAD narrative entry indicating we have received an Emergency Radio Activation from one of the radios associated with personnel assigned to the incident. If an emergency activation is detected, an alert flashes on the Incident Command page as illustrated in FIG. 31.

By clicking the Acknowledge button, the alert is acknowledged and logged along with the timestamp of the acknowledgement. The alert no longer displays after it has been acknowledged.

Apparatus Profile

Figure 32:
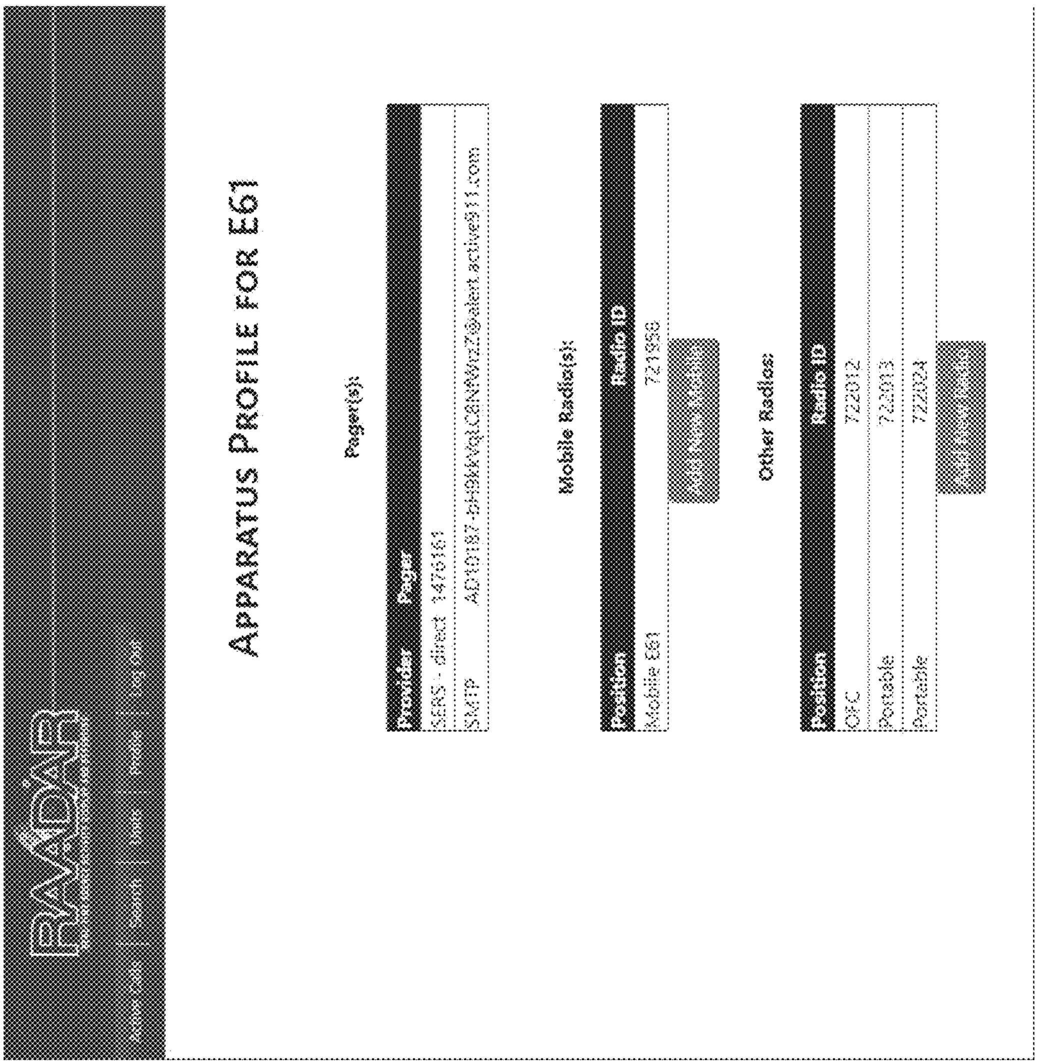

Individual apparatus profiles can also be edited from within RAADAR. The first step is to have the apparatus added to the ePASS role. When added to the ePASS role, the apparatus user now has the ePASS sub menu under the Profile menu as illustrated in FIG. 32.

Pager(s):

Clicking in this grid allows you to edit the pager information associated with the apparatus.

Mobile Radio(s):

Clicking this grid allows the mobile radio ID to be edited. It is also possible to add multiple mobiles to an apparatus, where appropriate (e.g. Light Force).

Other Radios:

This grid allows you to edit the position name and associated Radio ID on a given apparatus. You can also click the Add New Radio button to create another radio position on the apparatus.

TriTech/Central Square InformCAD Integration

The information saved on the ePASS Personnel Profile page as well as the radio assignments are also saved in InformCAD. This allows the Fire Dispatchers to have the same information available to them in CAD that the incident commanders have in RAADAR.

Profile Settings

Figure 33:
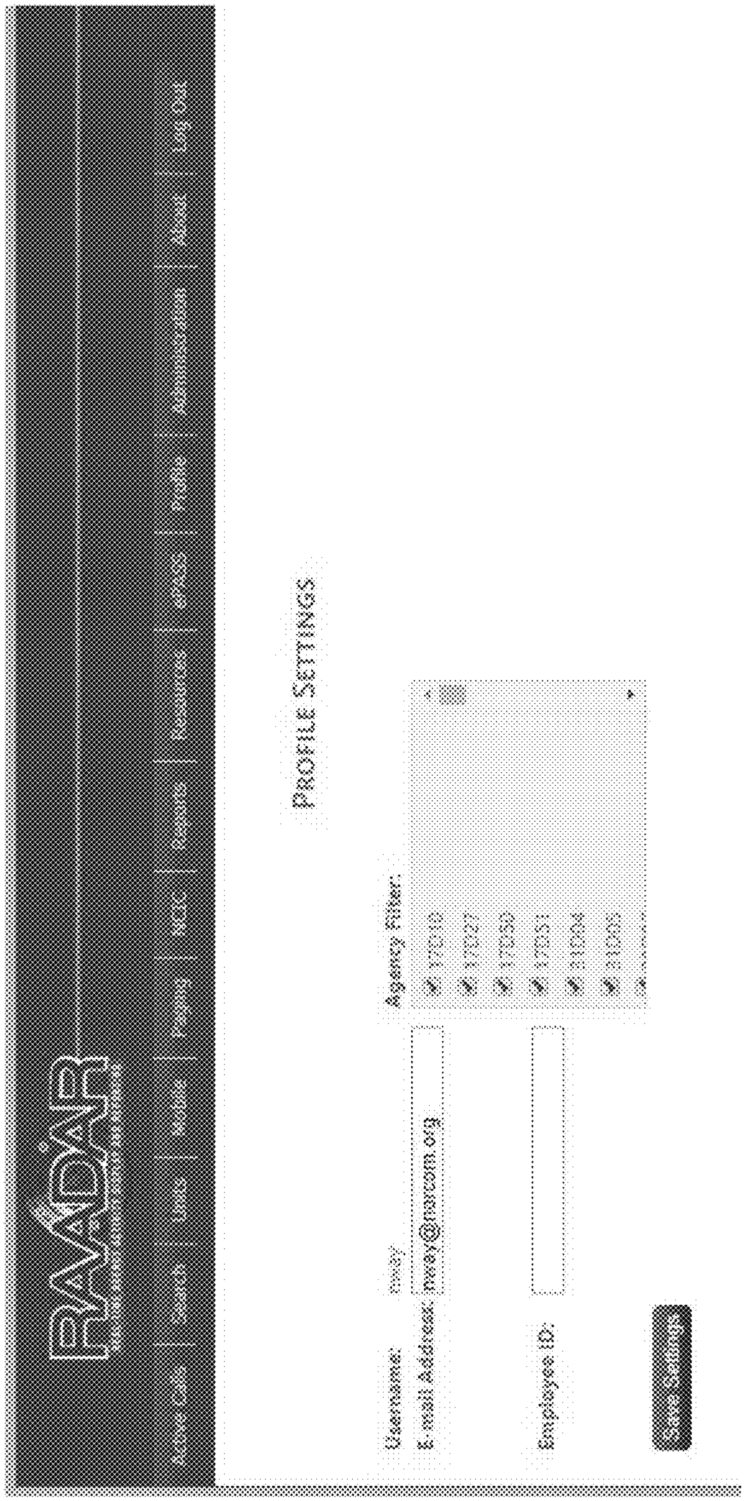

A new page has been added to RAADAR to enable the end-user to manage their profiles. Users are able to update their E-mail address and select a list of agencies to display in RAADAR based on the agencies they have been assigned permission to view as illustrated in FIG. 33.

An embodiment provides the ability to automate through software the translation of disparate field names (e.g., "domestic violence," "robbery," "burglary," etc.) and/or acronyms for such names into a common format. An embodiment of the invention includes a method to achieve consistency through a software product utilizing proprietary software technology within the RAADAR software. One or more embodiments of the invention have applications throughout all commercial applications where multiple vendors exist to accomplish similar tasks within databases, fields or tables, but utilize proprietary field names or dissimilar naming conventions to accomplish tasks. An embodiment utilizes dissimilar and disparate CAD systems to join like data to achieve a common format and name translation. However, this translation has application in any industry or software application including public safety, systems shared among jurisdictions or numerous other applications.

An embodiment allows users of the RAADAR software to perform call searches across multiple Public Safety Answering Points (PSAPs) each of which may use a different role CAD software system. When a user defines a call search in RAADAR, the software tests to see if the user is selecting agencies that span multiple PSAPs. If so, the call-types translation table is utilized which allows the user to search generalized call types. These generalized call types are then dynamically translated into the actual call type in use at the PSAP being searched.

An embodiment of the invention, which may be referred to herein as the "RAADAR translation table," dynamically translates a common name into the name(s) in use at a PSAP. For instance: "Domestic Violence" at one PSAP may be "DVP" at another or "DV VERBAL" at yet another. RAA- DAR translation table once connected to systems takes those three field-name variations and translates it into a common unified format within RAADAR to "Domestic Violence." An approach according to an embodiment is unified, understanding each vendor, customer, solution is different but streamlining common operations into the unified shared approach across dissimilar vendors and customers.

Figure 34:
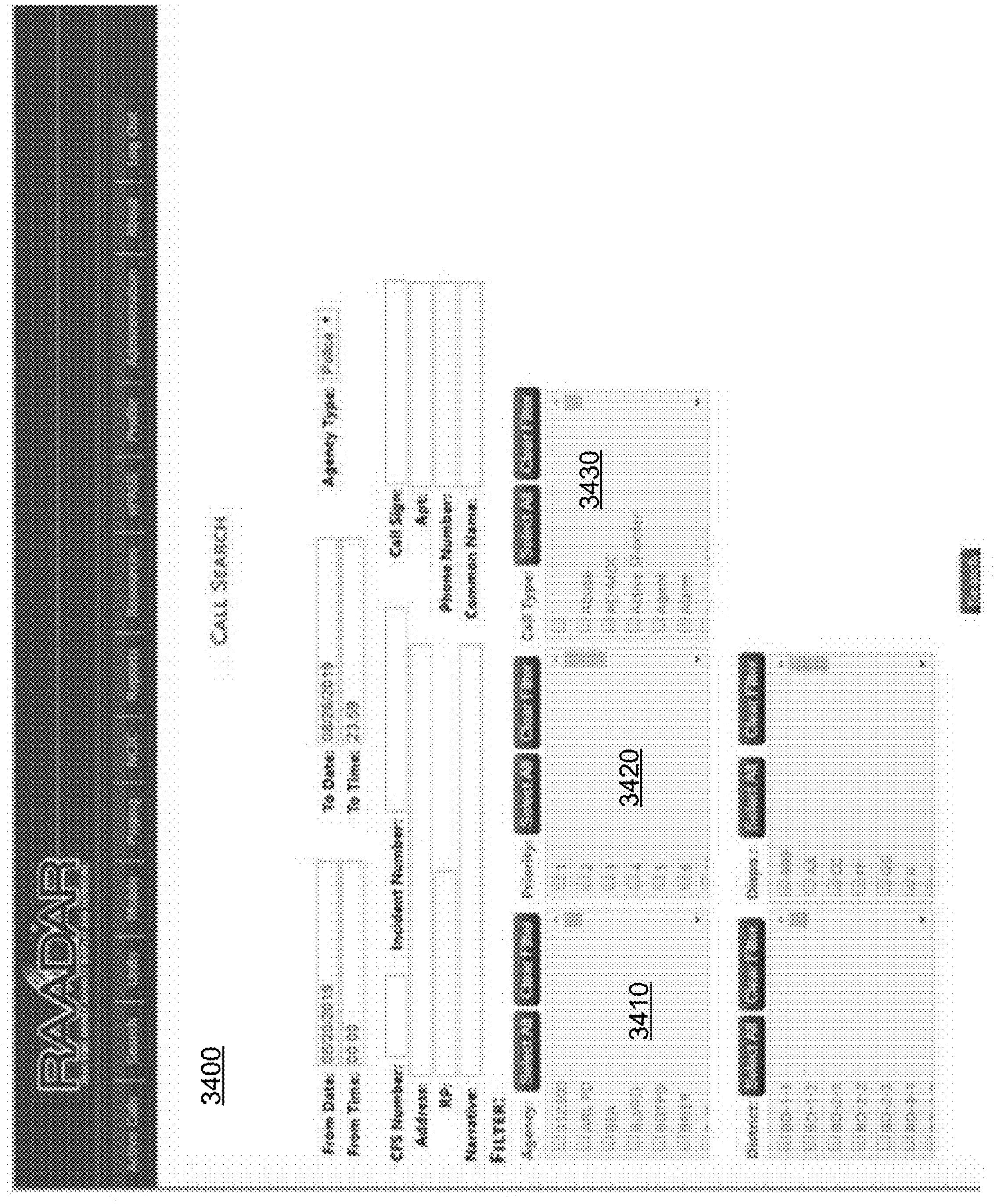
FIGS. 34-36 are screenshots illustrating functionality of a dynamic translation table according to an embodiment of the invention.

A method according to an embodiment is as follows. As shown in FIG. 34, a user can initiate a new Call Search within a user interface 3400 generated by the RAADAR system. The user selects from a menu 3410 agency/agencies to search. An embodiment consults a memory to check whether the selected agencies belong to one or more PSAPs. If the selected agencies belong to more than one PSAP, the translation table is consulted, and the respective Call-Type codes used by those agencies are presented to the user as a generic code. When the user submits the search, the translation table is used to translate the generic call type to the PSAP-specific call type(s) for the agency being searched. Note that a generic call type may translate into more than one call type at any given PSAP.

Features of one or more embodiments include the following:

A SQL database table that contains a column for the generic call types, then one column for each PSAP containing the corresponding specific call type(s). The PSAP column may contain textual or numeric representations of call types, depending on the CAD software system in use at a given PSAP.

C# code in an embodiment that tests whether multiple PSAPs are being searched.

C# code that utilizes the translation table to convert to the native call type in use at a given PSAP.

Taking a generic call type and translating it into a specific call type in use in a given software application.

Translating a specific call type into a more generic version.

Dynamically translating specific, disparate call types into generic versions for consistency.

Referring to the screenshot illustrated in FIG. 34, an embodiment allows RAADAR to search for a common, generic call type across multiple PSAPs. When a user first navigates to the Call Search interface 3400, the Priority 3420 and Call Type 3430 lists are populated based on the user's "home" agency.

Figure 35:
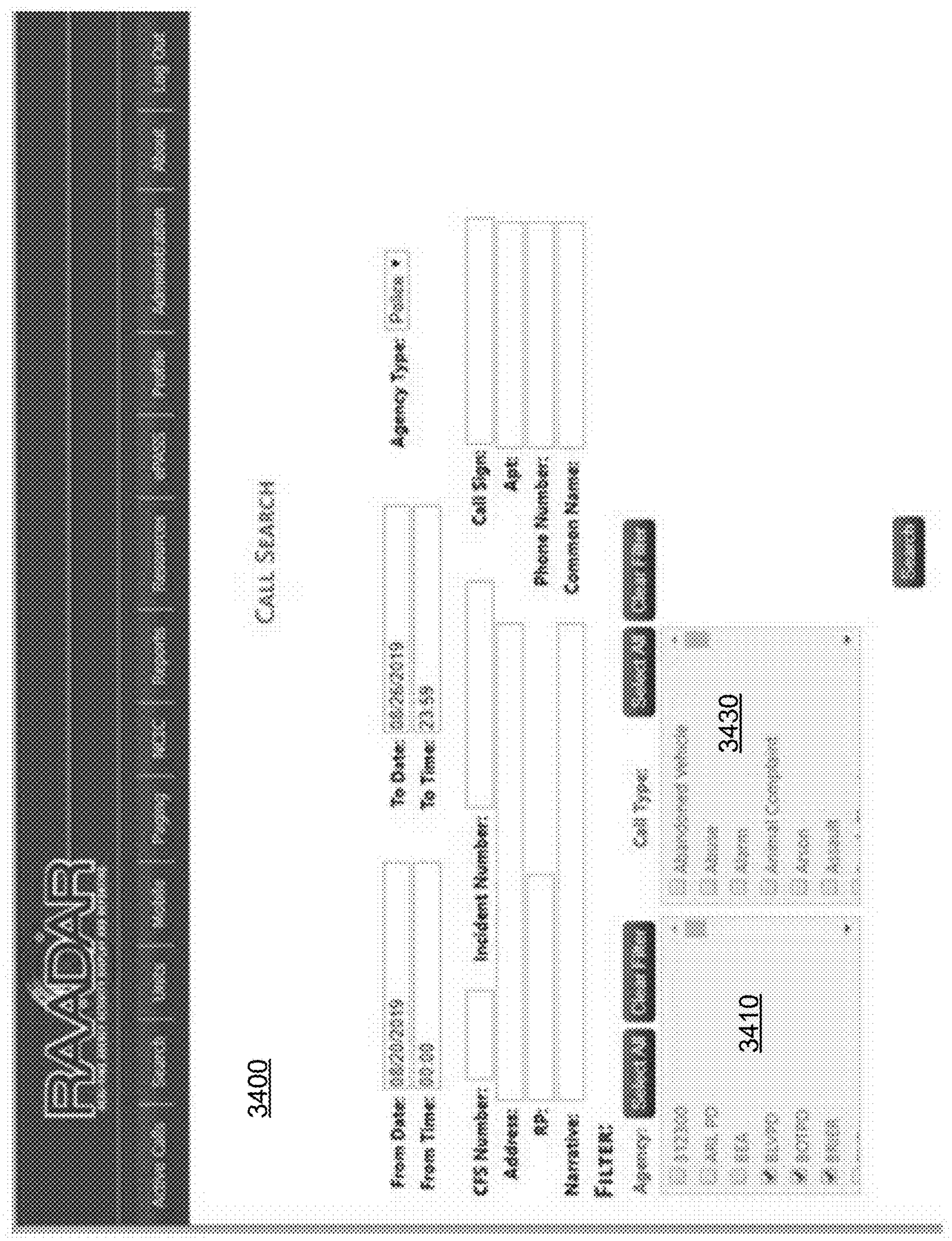

Referring to the screenshot illustrated in FIG. 35, an embodiment allows a user to select from the menu 3410 of Call Search interface 3400 two or more agencies that reside in more than one PSAP. The screen may automatically update to hide the Priority list 3420 (not all PSAPs utilize priorities) and populate the Call Type list 3430 with generic call-type codes corresponding to the Call-Type codes specific to the selected two or more agencies.

Figure 36:

Referring to the screenshot illustrated in FIG. 36, an embodiment allows a user to, for example, search for all traffic-type calls in a predetermined time interval such as, for example, the past week. As illustrated in FIG. 36, the selection of the generic call-type code of "Traffic" from Call Type list 3430 has retrieved call entries associated with Call-Type codes "T", "TRAFFIC STOP" and "Traffic General" used by three different PSAPs: NORCOM (BLVPD), Bothell (BPD) and Sno911 (BRIER).

One or more embodiments provide software development enhancement to automate through software the display of heat maps graphically depicting emergency-service-provider incident data. One or more embodiments provide a method to dynamically produce a heat map from the results of any Cleared Call Search within the company's RAADAR software application. One or more embodiments enable any public safety agency to produce heat maps of incident data "on the fly" enabling a greater level of statistical analysis than was previously available. Public Safety Agencies without dedicated analysis staff can now produce maps showing concentrations of various public safety events. One or more embodiments of the invention take the results of a Cleared Call Search performed in RAADAR and dynamically generates a heat map. This heat map depicts where the incidents are located and whether there are concentrations of incidents in any given area. RAADAR further enhances this feature by enabling the user to search neighboring jurisdictions to get broader situational awareness.

A method according to an embodiment is as follows: a user initiates a new Call Search within using the Call Search interface 3400. The user selects agency/agencies using menu 3410, call type(s) using Call Type list 3430 and/or date range(s) using alphanumeric entry fields 3440 to search. RAADAR performs the call search and saves the results to a temporary XML file stored on the RAADAR server. The user clicks a "Generate Heatmap" button. RAADAR utilizes the information in the XML file to generate a heat map which may then be displayed in a new web browser tab. Each call may be graphed as a black dot or other indicator in the heat map. The black dot can be clicked and a popup window will appear displaying details of the call (call date/time, call type, agency, etc.).

Features of one or more embodiments include the following:

RAADAR code directs it to save a copy of any cleared call search result to an XML file on the RAADAR server.

After the XML data file is saved, an XML schema file is saved that describes the format of the XML data file.

The name of the XML file is randomly generated and saved in a non-displayed column in the call search results grid.

When the Generate Heatmap button is clicked, C# code is executed that retrieves the file name, reads the contents of the XML file, formats it into the proper syntax for heat maps and generates the heat map.

Dynamically generating a heat map from call search results.

Dynamically generating a heat map utilizing a base map (e.g., Google, Bing Maps, ESRI ArcGIS, OpenStreetMap, etc.) from call search results.

Dynamically generating a heat map from other search results.

Figure 37:
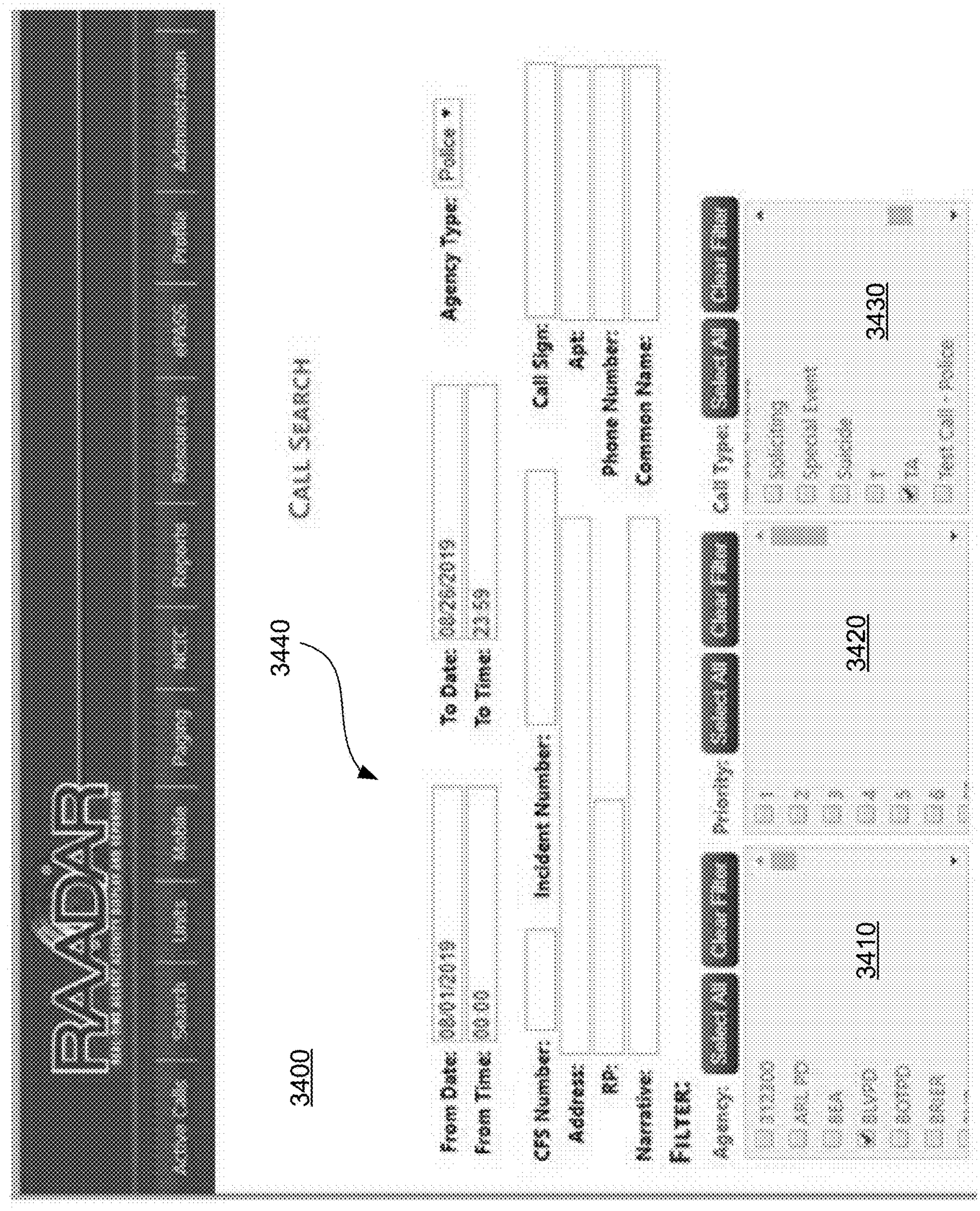
FIGS. 37-40 are screenshots illustrating functionality of heat map generation according to an embodiment of the invention.

Referring to the screenshot illustrated in FIG. 37, a user can, for example, use the Call Search Interface 3400 to search for all Traffic Accidents (in the illustrated example by selecting the code "TA" from the Call Type list 3430) for a selected time period (the month of August 2019) for Bellevue Police (selection of "BLVPD" in menu 3410).

Figure 38:
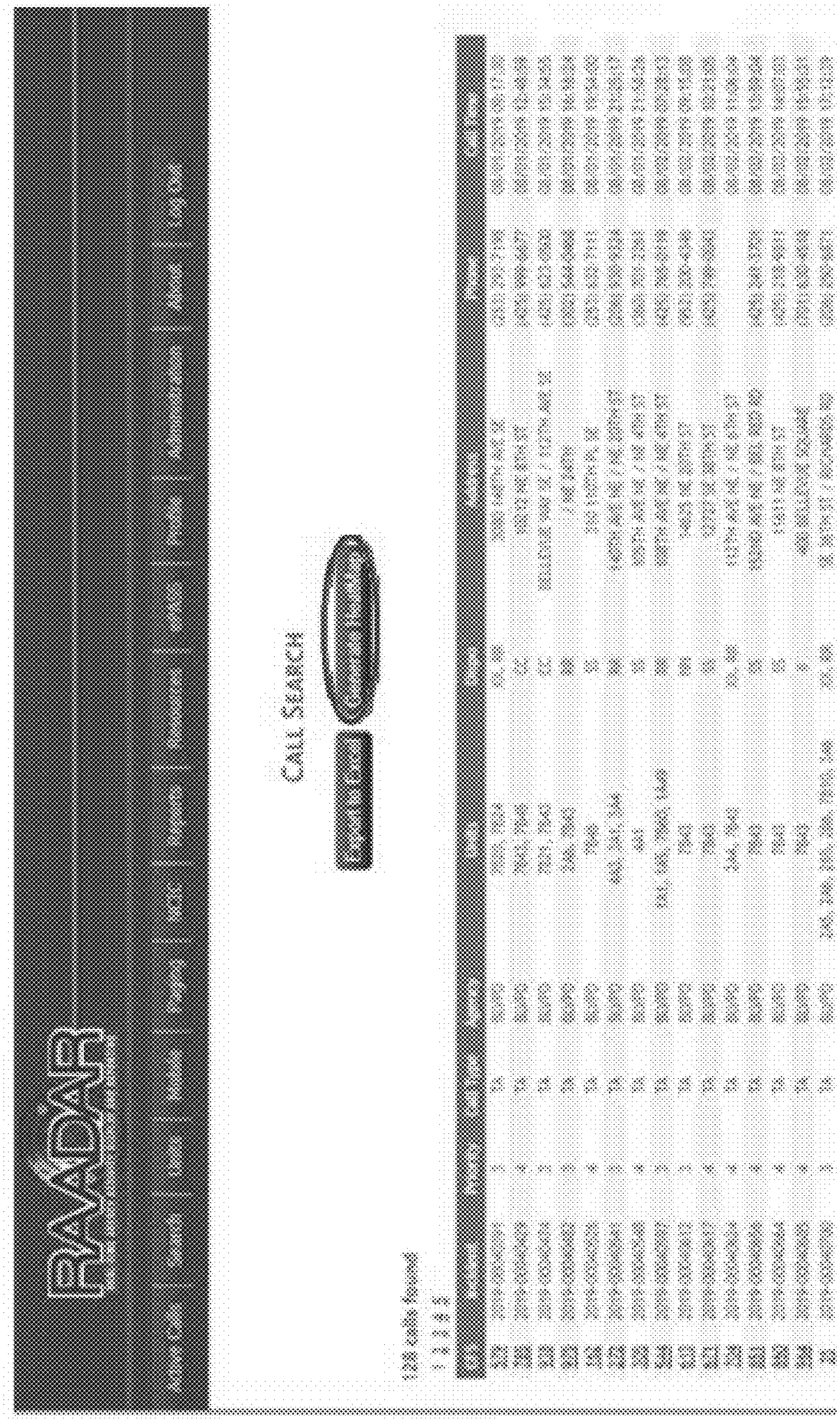
Figure 39:
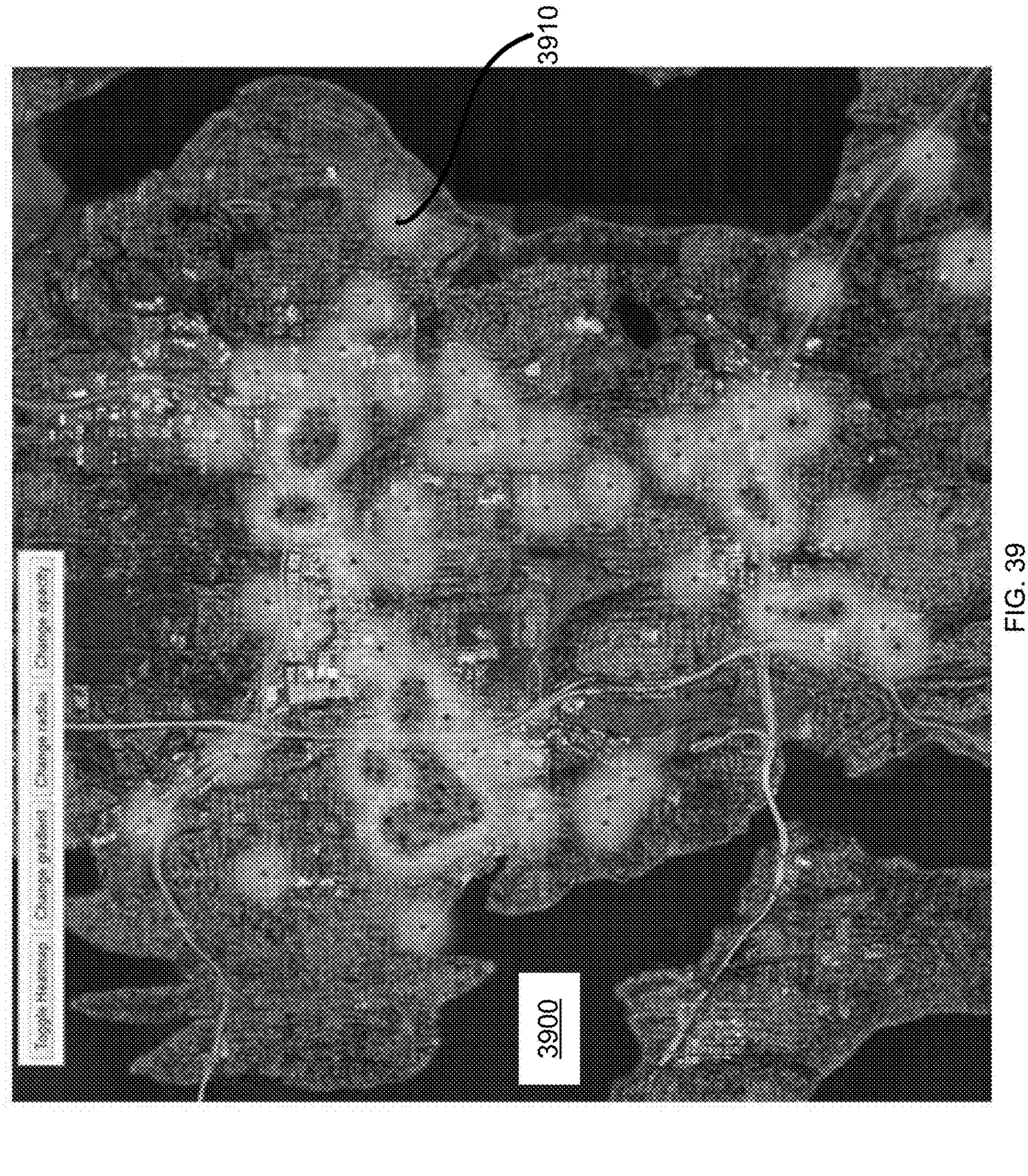

Referring to the screenshot illustrated in FIG. 38, such a search results in the display of multiple call entries matching the search parameters. By clicking on the Generate Heatmap button 3800 shown in FIG. 38, a new window, illustrated in FIG. 39, opens with all of the calls displayed in FIG. 38 mapped as a heat map 3900 of the aerial location in which the incidents associated with the displayed call entries took place. Each such incident may be indicated by a black dot 3910 representing an individual call (or traffic accident, in this illustrated example). Differently colored areas, for example, of the heat map each indicate a respectively different corresponding concentration of accidents in the selected time period.

Figure 40:
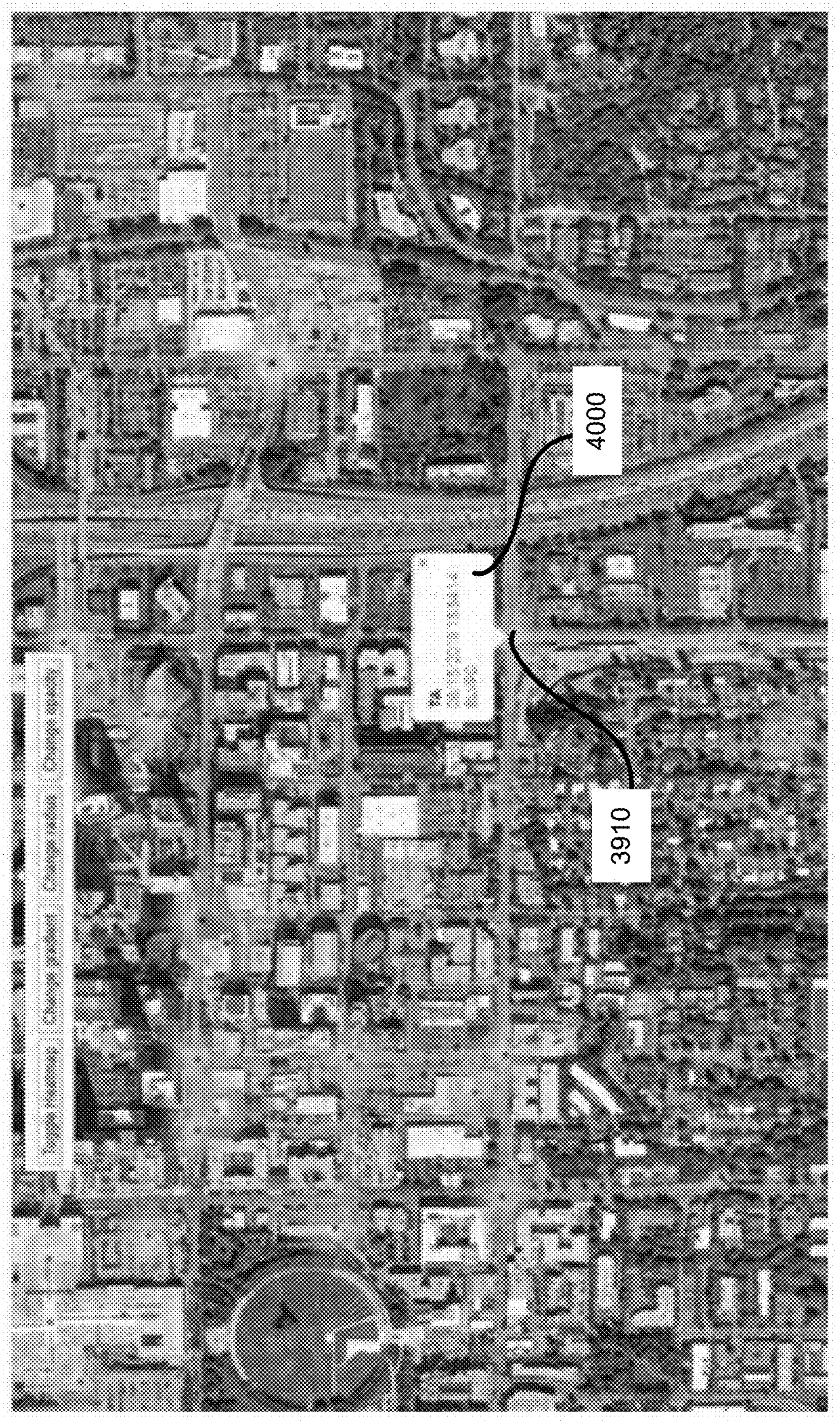

The black dots 3910 can be clicked, which, as is illustrated in FIG. 40, will open a window 4000 showing information pertaining to the corresponding call/incident.

One or more embodiments may include a software enhancement to a company's RAADAR application that automatically connects to the correct Public-Safety Answering Point (PSAP) in cases of mutual aid calls. One or more embodiments provide a method to automatically connect to the PSAP requesting mutual aid from a neighboring jurisdiction. One or more embodiments provide first responders dispatched on a mutual aid call the ability to see the call details directly from the originating PSAP regardless of the Computer-Aided Dispatch (CAD) software application in use. This untethers the end user from their own CAD vendor and allows them access into disparate CAD systems. Such embodiments increase situational awareness for first responders.

One or more embodiments provide first responders more detailed information when assigned to a mutual aid call. These calls are when a neighboring jurisdiction that is served by another PSAP asks for additional resources to respond to a call for service. When the first responder opens up the mutual aid call in RAADAR, the call details are automatically retrieved from the originating PSAP that is different from the home PSAP the first responder is dispatched from.

A method according to an embodiment is as follows: A first responder logged into RAADAR is dispatched on a mutual aid call. The first responder opens the call in a RAADAR user interface to see the call details. RAADAR detects that the call is mutual aid and determines what the originating PSAP is, connects to that PSAP and retrieves the call details. RAADAR displays the call details from the originating PSAP to the first responder(s).

Features of one or more embodiments include the following:

C# code and logic that determines when a call is Mutual Aid, what the source PSAP is, and instructions for connecting to that PSAP and retrieving the unique Call ID associated with the incident.

RAADAR then redirects the user's screen to retrieve the incident details from the originating PSAP.

Viewing Call Details within the RAADAR Application.

Figure 41:
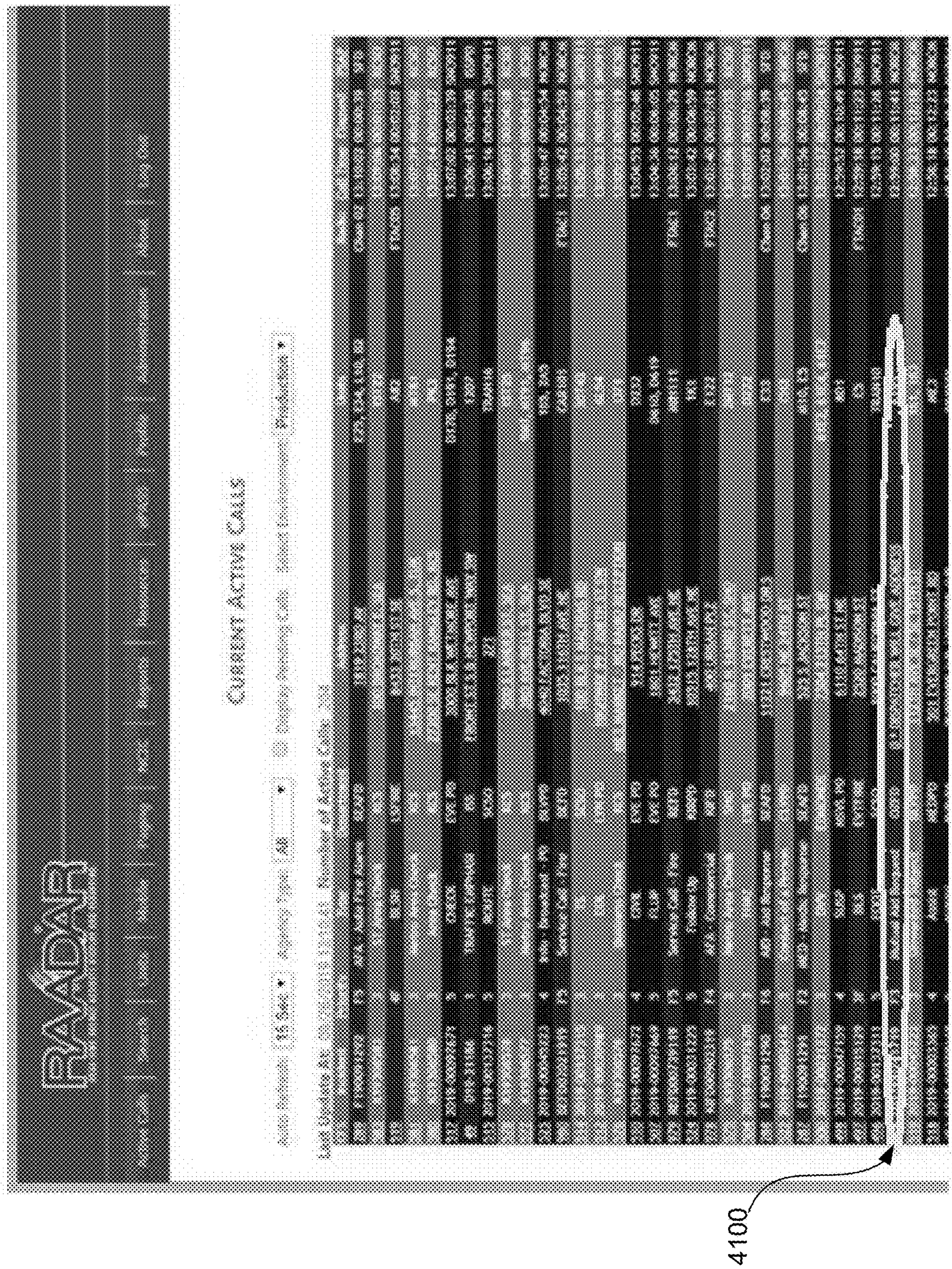
FIGS. 41-43 are screenshots illustrating functionality of a mutual-aid according to an embodiment of the invention.
Figure 42:
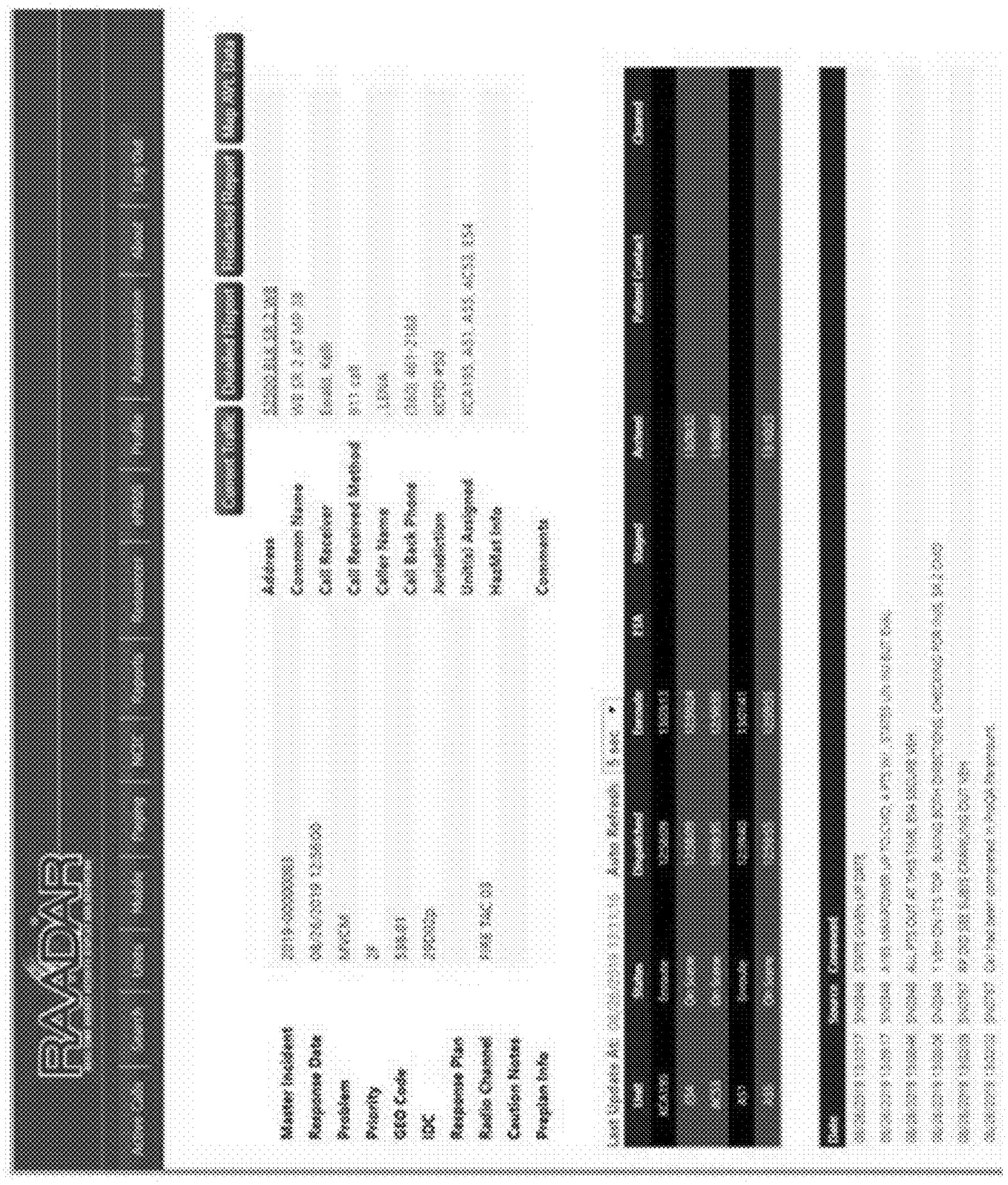
Figure 43:
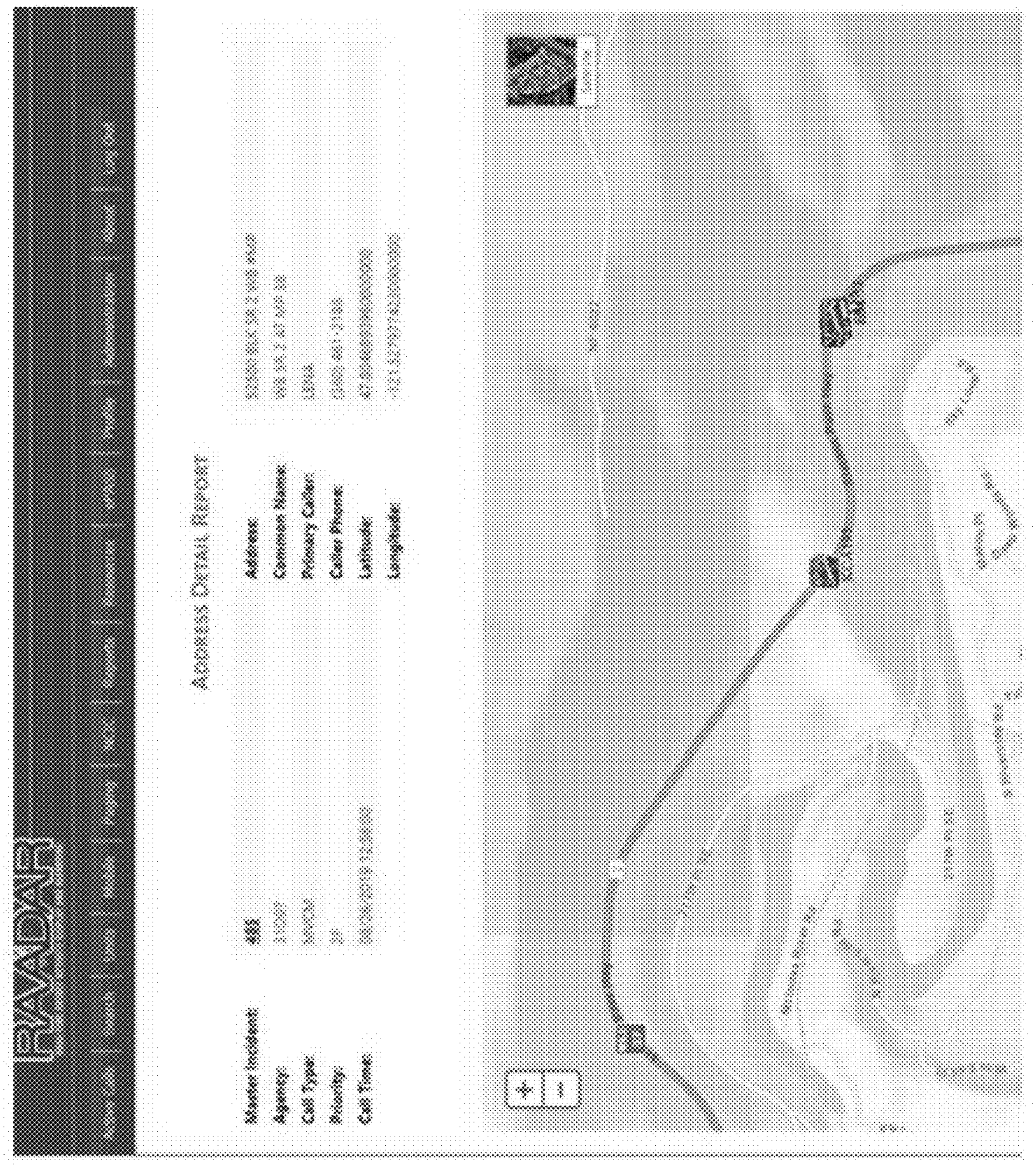

Referring now to the screenshot of FIG. 41, call (CFS) number 974 as denoted by the circle and reference numeral 4100 is a Mutual Aid Request for emergency-response unit vehicle A195. The address is listed as "0* DISPATCHER WILL GIVE ADDRESS." Prior to an embodiment of this invention, the aid crew of A195 would have to be told over the radio what they were to do and where they were going. They would also have to look up the address on their own in a maps application to get driving directions. An embodiment of the invention detects that the call is a Mutual Aid Request and includes logic to determine what PSAP the call originated in. When the user clicks on this CFS 974 entry, the user is automatically redirected to the call from the originating PSAP's CAD system. This contains more detailed information including call narratives, which other units have been dispatched, the radio channel and a hyperlinked address that will open a map as illustrated in FIG. 43 in a new window that is centered on the reported address. In the example illustrated in the screenshot of FIG. 42, the call details have been retrieved from agency Sno911. In FIG. 43, NORCOM A195 is denoted as "KCA195"—the two-letter prefix indicating it's a King County unit.

An embodiment provides the ability to automate alerting of units at a given first-responder station when they are dispatched on a call for service. One or more embodiments of the invention have applications throughout all commercial applications where multiple vendors exist to accomplish similar tasks to alert field units. An embodiment supplements and enhances existing automated alerting systems to provide critical information to first responders prior to leaving their first-responder station.

Figure 44:
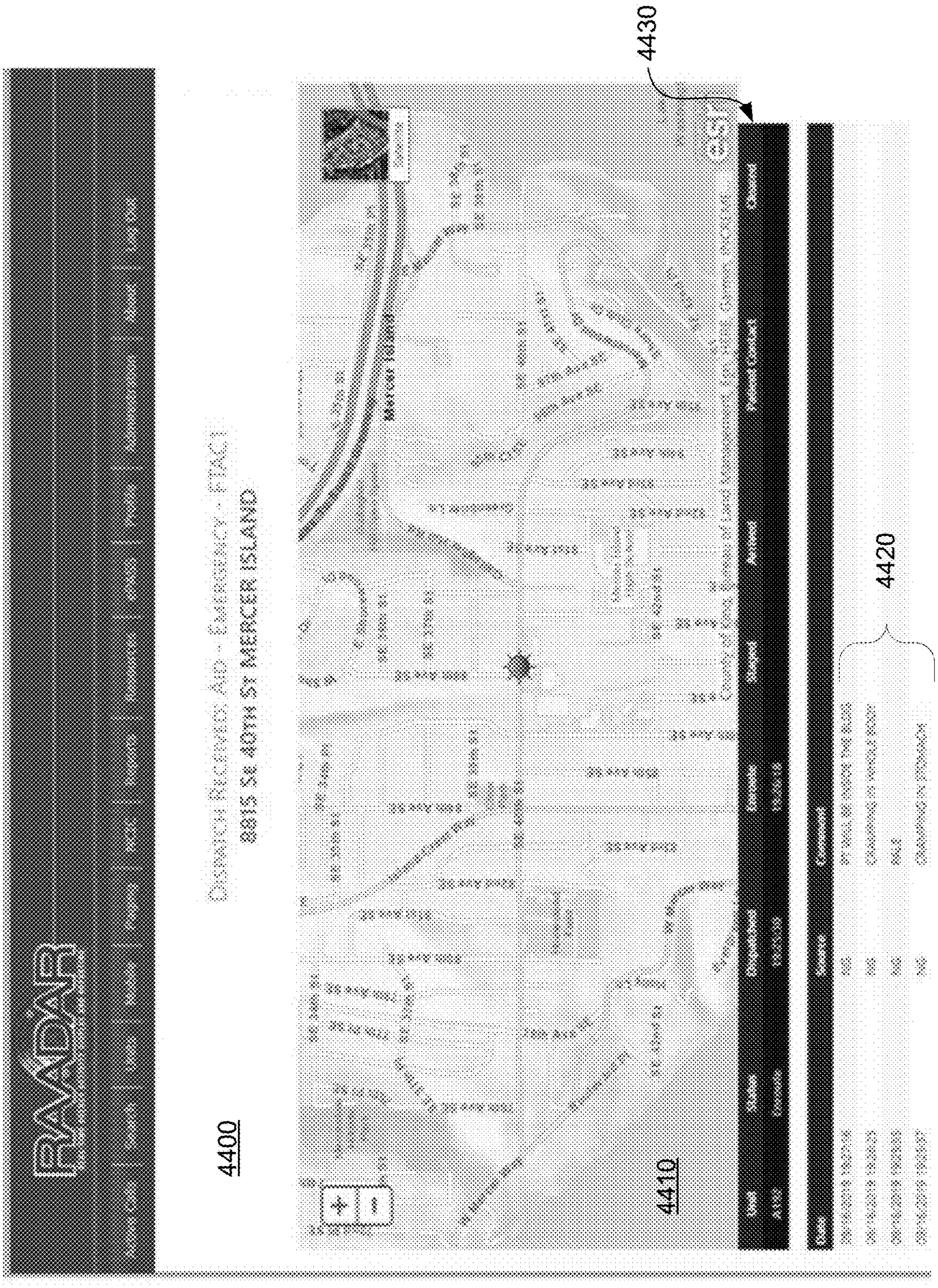
FIG. 44 illustrates a screenshot of a dispatch-received summary screen according to an embodiment of the invention.

Such an embodiment allows users of the RAADAR software to run the application in an unattended computer console ideally located in the apparatus bay of a first-responder station. The computer is logged into RAADAR utilizing a specific first-responder station login (e.g., ST1) and RAADAR constantly checks for calls that are assigned to the units currently posted at the first-responder station. Once a unit has been dispatched, and referring to FIG. 44, RAADAR automatically redirects to a Dispatch Summary screen 4400. This screen has a large map 4410 displayed at the top centered on the address of the event to which a response is required. This address can be indicated by an icon on the map 4410 and in text on the screen 4400. Below the map is a narrative 4420 of the call updated in real-time. Once all of the units posted at that station have changed their status to "enroute," RAADAR redirects automatically back to the default active calls page.

The constraints on and limitations of previous approaches are related to a closed product approach that is only a single solution for that one corresponding software company, or any installation that may have that same software. An embodiment bridges that gap by providing an important safety feature that is independent of CAD systems. Our approach is unified, understanding each vendor, customer solution is different but streamlining common operations into the unified shared approach across dissimilar vendors and customers.

One or more embodiments of the invention include the following steps and functionality:

User Logs into RAADAR with a Station-Specific User ID.

RAADAR displays the default active calls page such as that discussed above herein. In the background, RAADAR continually polls the SQL database checking for any units currently posted at the station that have been assigned to a call for service.

If a posted unit is assigned to a call, RAADAR redirects to the Dispatch Received call summary page 4400, which displays the map 4410, listing 4430 of unit(s) assigned and the call narrative 4420 that updates in real-time.

After all of the unit(s) assigned to the call have indicated they are enroute, RAADAR redirects back to the default active calls page.

A volunteer station flag exists within RAADAR that delays the return to the active calls page until all of the units have arrived on-scene. This gives volunteer first responders more time to arrive at the station and ascertain the details of the call for service.

One or more embodiments of the invention include the following features:

An SQL Stored Procedure that contains a custom SQL query, which performs the search for units posted at a given station that have been dispatched on a call.

C# code in RAADAR that executes the SQL stored procedure every page refresh (5-10 seconds, for example).

C# code that redirects to the Dispatch Received call summary page and displays the pertinent information.

C# code that returns to the default active calls screen once the units are in an enroute status (or on-scene in the case of the Volunteer flag).

While the preferred embodiment of the invention has been illustrated and described, as noted above, many changes can be made without departing from the spirit and scope of the invention. For example, at least one embodiment described above herein may be implemented in connection with Fire and EMS units, in addition to the Police units discussed in the illustrated examples. Additionally, at least one embodiment described above herein may be implemented with respect to non-emergency service providers, such as mail and package delivery, grocery delivery, and large-scale transportation operations such as shipping and airlines. An embodiment may include GIS layers, for example, that enable the placement in the aerial view 700, 900 of police and fire station locations, as well as fire response areas and police beats. In an embodiment, icons representing the station locations, response areas and or beats may be selected by user, in response to which icons representing movement of all units associated with such locations/areas/beats may be automatically shown in the aerial view 700, 900. Additionally, clicking on any of the icons representing a response unit may open up a window, for example, indicating the unit's call sign, their location, and the time-stamp of that particular AVL plot. Additionally, an embodiment may include animation controls associated with the aerial view 700, 900 enabling a user to control the speed at which the icons representing response vehicles are sequentially placed in the aerial view to illustrate the movement of the corresponding unit. These controls also enable the user to control the length of the icon "vector" (i.e., the number of icons shown at any given time to illustrate movement of the corresponding vehicle) during the animation within the aerial view 700, 900. Moreover, the electronic histories described above may be processed in such a manner as to allow the user to view movement of a vehicle in "near real-time" in the aerial view 700, 900. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. At least one non-transitory computer-readable medium including instructions that, when executed by at least one processing device, enable the at least one processing device to perform a method, the method comprising the steps of:

accessing over a network a first computer-aided dispatch database, the first database having a first database identifier and including a first data-set having a first data-set identifier, the first database further including a second data-set having a second data-set identifier different from the first data-set identifier, the first data-set characterizing the location of at least one incident responded to by at least one emergency response vehicle, the second data-set characterizing a narrative of specific events occurring as a result of the incident;

retrieving from the first computer-aided dispatch database the first database identifier and first and second data-set identifiers over the network from the first database;

presenting on a display device the first and second data-set identifiers in a graphical user interface (GUI);

in response to receiving a selection of at least one of the first and second data-set identifiers from a user, retrieving over the network from the first database the first and second data-sets; and displaying the incident location and the narrative of specific events in the GUI.

2. The non-transitory computer-readable medium of claim 1, wherein the set of at least one service provider comprises a police unit.

* * * * *